(12) United States Patent
Egawa

(10) Patent No.: US 6,203,193 B1
(45) Date of Patent: Mar. 20, 2001

(54) RADIATION THERMOMETER AND METHOD FOR ADJUSTING THE SAME

(75) Inventor: Shunji Egawa, Tokyo (JP)

(73) Assignee: Citizen Watch Co. Ltd., Tokyo (JP)

( * ) Notice: Subject to any disclaimer, the term of this patent is extended or adjusted under 35 U.S.C. 154(b) by 0 days.

(21) Appl. No.: 09/308,527

(22) PCT Filed: Sep. 22, 1998

(86) PCT No.: PCT/JP98/04260

§ 371 Date: May 19, 1999

§ 102(e) Date: May 19, 1999

(87) PCT Pub. No.: WO99/15866

PCT Pub. Date: Apr. 1, 1999

(30) Foreign Application Priority Data

Sep. 22, 1997 (JP) .................................................... 9-256403

(51) Int. Cl.[7] .............................. G01J 5/10; G01K 1/20; G01K 7/00; A61B 6/00

(52) U.S. Cl. ..................... 374/126; 374/129; 374/130; 374/131; 374/132; 374/133; 600/474

(58) Field of Search ..................... 374/126, 129, 374/132, 131, 133, 170, 130, 172; 600/474

(56) References Cited

U.S. PATENT DOCUMENTS

| | | | |
|---|---|---|---|
| 4,932,789 | * 6/1990 | Egawa et al. | 374/126 |
| 5,024,533 | * 6/1991 | Egawa et al. | 374/126 |
| 5,122,796 | * 6/1992 | Beggs et al. | 340/904 |
| 5,159,936 | * 11/1992 | Yelderman et al. | 374/126 |
| 5,232,284 | * 8/1993 | Egawa et al. | 374/126 |
| 6,102,564 | * 8/2000 | Egawa | 374/129 |
| 6,109,782 | * 8/2000 | Fukura et al. | 374/131 |

FOREIGN PATENT DOCUMENTS

| | | | |
|---|---|---|---|
| 05231953 | * | 9/1993 | (JP) . |
| 07178061 | * | 7/1995 | (JP) . |
| 08101074 | * | 4/1996 | (JP) . |
| 08261840 | * | 10/1996 | (JP) . |

* cited by examiner

*Primary Examiner*—G. Bradley Bennett
*Assistant Examiner*—Gail Verbitsky
(74) *Attorney, Agent, or Firm*—Townsend and Townsend and Crew LLP

(57) ABSTRACT

A radiation thermometer is rationally adjusted during manufacturing processes instead of requiring a user to manually adjust the radiation thermometer each time a temperature is measured, and hence, the radiation thermometer better improves temperature measurement accuracy. The radiation thermometer comprises an infrared ray sensor for detecting an infrared ray from a measurement target; a temperature-sensitive sensor for generating a reference temperature signal; sensor output adjusting means for adjusting an output from the temperature-sensitive sensor and an output from the infrared ray sensor; temperature calculating means for calculating a temperature of the measurement target based on an adjusted temperature-sensitive sensor output and an adjusted infrared ray sensor output which are adjusted by the sensor output adjusting means; and temperature indicating means for indicating the temperature of the measurement target based on a signal from the temperature computing means, and the radiation thermometer is characterized in that the sensor output adjusting means comprises temperature-sensitive sensor absolute value adjusting means (ABS) for adjusting an absolute value of a characteristic of the temperature-sensitive sensor and infrared ray sensor sensitivity adjusting means (KAN) for adjusting a sensitivity of the infrared ray sensor.

22 Claims, 14 Drawing Sheets

RADIATION THERMOMETER AND METHOD FOR ADJUSTING THE SAME

TECHNICAL FIELD

The present invention relates to a radiation thermometer and a method of adjusting the same.

BACKGROUND ART

For the purpose of measuring a body temperature in a short period of time, a radiation thermometer which uses an eardrum as a measurement site and measures the temperature of the eardrum in a non-contact manner has been already proposed.

An example of such radiation thermometer is described in Japanese Laid-open Patent Publication No. 117422/1986. This radiation thermometer allows a head portion of a probe unit to be inserted into an external acoustic opening so that a light-guiding tube disposed at the head portion converges heat radiation from the eardrum onto an infrared ray sensor and temperature of the eardrum is measured. A main body portion includes a black body for calibration which is controlled to be a reference temperature (36.5° C.). Further, the probe unit including this infrared ray sensor is also equipped with heating control means for pre-heating to the reference temperature (36.5° C.). The head portion is pre-heated to a temperature which is close to a body temperature, and with the head portion in such a condition a temperature is calibrated using the black body of the main body portion. Since this enables calibration each time measurement is executed, it is possible to ignore various causes for error. In addition, temperature of the head portion does not change even when the head portion is inserted into an external acoustic opening, and therefore, a measurement error caused by a temperature change of the head portion is overcome. That is, it is necessary to ensure that the temperature of an inner surface of the light-guiding tube is the same as the temperature of the infrared ray sensor itself, so that heat radiation from the light-guiding tube itself will not cause a measurement error. Hence, in order to avoid a temperature change in the head portion even with the head portion inserted into the external acoustic opening, the temperature of the head portion is stabilized at the reference temperature (36.5° C.). In this manner, heat radiation from the inner surface of the light-guiding tube can be ignored. However, the radiation thermometer which is described in Japanese Laid-open Patent Publication No. 117422/1986 needs a heating control device of high control accuracy, and therefore, requires a complex structure and circuitry, which causes increase in size of the device and cost. Further, a long stabilizing time is necessary in order to pre-heat the head portion and control the heat portion to ensure a constant temperature. Still further, since a large amount of energy is required to drive the heating control device, this system is not applicable to a portable thermometer in which a small-size battery is used as an energy source.

Against this background, a small portable radiation thermometer with high temperature measurement accuracy which does not comprise a heating control device has been proposed.

An example of a radiation thermometer described in Japanese Laid-open Patent Publication No. 28524/1990. The radiation thermometer which is described in Japanese Laid-open Patent Publication No. 28524/1990 is the same as the radiation thermometer which is described in Japanese Laid-open Patent Publication No. 117422/1986, with respect to use of a light-guiding tube as an optical system for converging heat radiation from an eardrum. However, the radiation thermometer described in Japanese Laid-open Patent Publication No. 28524/1990 does not include a heating control device of an infrared ray sensor, but instead, temperatures of the infrared ray sensor and the light-guiding tube are approximately the same as an ambient temperature, namely, a room temperature. In addition to provision of a first temperature-sensitive sensor in the vicinity of the infrared ray sensor, a second temperature-sensitive sensor is disposed at the light-guiding tube so that a temperature is measured based on the temperatures of the infrared ray sensor and the light-guiding tube. While measurement is not allowed when a temperature difference between the infrared ray sensor and the light-guiding tube is abnormally large, when the temperature difference is smaller than a preselected set value, measurement is allowed despite such temperature difference, computation is executed considering the temperatures of the infrared ray sensor and the light-guiding tube, and body temperature data are calculated. The computation for calculating the body temperature data in the radiation thermometer is conducted by a microcomputer based on an output voltage from the infrared ray sensor, an output temperature from the first temperature-sensitive sensor which measures the temperature of the infrared ray sensor and an output temperature from the second temperature-sensitive sensor which measures the temperature of the light-guiding tube. For example, when a probe is inserted into the external acoustic opening, the temperature of the light-guiding tube gradually rises while the temperature of the infrared ray sensor stays almost unchanged. Although this creates a temperature difference between the infrared ray sensor and the light-guiding tube, as body temperature data are calculated through computation which considers these temperatures, an error due to such temperature difference is avoided despite the temperature difference.

However, the radiation thermometer described in Japanese Laid-open Patent Publication No. 28524/1990 has the following problems. That is, since body temperature data are calculated based on three variables in total, namely, temperature data of the two temperature-sensitive sensors and an output from the infrared ray sensor using a complex equation, a program for this computation installed in the microcomputer is complex and computation requires a long time. In addition, constants such as radiation rate of the light-guiding tube must be measured and set in advance for the complex equation used for the computation, and it is difficult to set the constants.

Noting this, the applicant of the present application disclosed in WO97/17887, a radiation thermometer in which based on an output voltage from an infrared ray sensor, an output temperature from a first temperature-sensitive sensor which measures temperature of the infrared ray sensor and an output temperature from a second temperature-sensitive sensor which measures temperature of a light-guiding tube, an analog circuit corrects an error which is caused by a temperature difference between the first temperature-sensitive sensor and the second temperature-sensitive sensor.

Meanwhile, U.S. Pat. No. 5,159,936 discloses a radiation thermometer which comprises a first infrared ray sensor for receiving both heat radiation from an eardrum and heat radiation from a light-guiding tube itself, and a second infrared ray sensor for receiving only heat radiation from the light-guiding tube itself, and in which an output from the second infrared ray sensor is subtracted from an output from the first infrared ray sensor and an error which is caused a temperature difference between the light-guiding tube and the infrared ray sensors is consequently corrected.

Furthermore, in the radiation thermometer described in WO97/17887, adjustment of temperature compensation of an optical system is performed on the radiation thermometer described in U.S. Pat. No. 5,159,936 so that it is possible to adjust the error with the radiation thermometer described in U.S. Pat. No. 5,159,936. However, WO97/17887 discloses only adjustment of temperature compensation of the optical system.

Further, as described earlier, the radiation thermometer which is described in Japanese Laid-open Patent Publication No. 117422/1986 requires a heating control device of high control accuracy, and therefore, requires a complex structure and circuitry, which causes increase in the size of the device and cost. In addition, a long stabilizing time is necessary in order to pre-heat the head portion and control the heat portion to ensure a constant temperature. Moreover, since a large amount of energy is required to drive the heating control device, this system cannot be applied to a portable thermometer in which a small-size battery is used as an energy source. Still further, it is further problem to perform adjustment each time a body temperature is measured.

DISCLOSURE OF INVENTION

The present invention has been made in view of the problems above. Accordingly, an object of the present invention is to provide a radiation thermometer which is rationally adjusted during manufacturing processes instead of user's manual adjustment of the radiation thermometer each time a temperature is measured, thereby to further improve temperature measurement accuracy.

To attain the objective above, a radiation thermometer according to the present invention in characterized by: an infrared ray sensor for detecting an infrared ray from a measurement target; a temperature-sensitive sensor for generating a reference temperature signal; sensor output adjusting means for adjusting an output from the temperature-sensitive sensor and an output from the infrared ray sensor; temperature calculating means for calculating a temperature of the measurement target based on an adjusted temperature-sensitive sensor output and an adjusted infrared ray sensor output which are adjusted by the sensor output adjusting means; and a temperature indicating means for indicating the temperature of the measurement target based on a signal from the temperature computing means, wherein the sensor output adjusting means comprises temperature-sensitive sensor absolute value adjusting means (ABS) for adjusting an absolute value of a characteristic of the temperature-sensitive sensor and infrared ray sensor sensitivity adjusting means (KAN) for adjusting sensitivity of the infrared ray sensor.

BEST MODE FOR CARRYING OUT THE INVENTION

The present invention will be described in the following with reference to the associated drawings.

Figure 1:
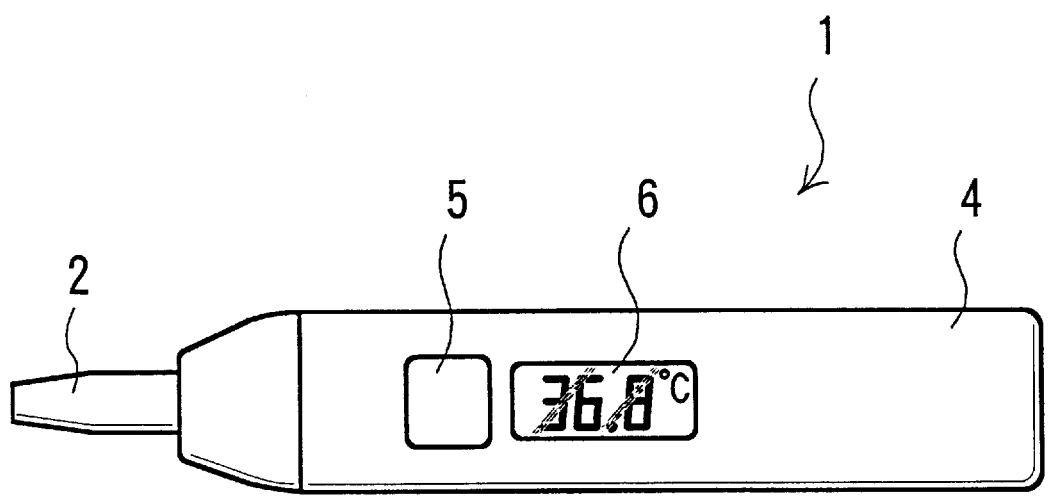
FIG. 1 is a front view of a radiation thermometer according to a first preferred embodiment of the present invention.

FIG. 1 is a front view of a radiation thermometer according to a first preferred embodiment of the present invention.

A radiation thermometer 1 is designed for measuring an eardrum temperature and comprises a main body 4 and a probe 2. The main body 4 includes a liquid crystal display element 6 for displaying a body temperature and a measurement switch 5 which is structured as a press button.

The radiation thermometer 1 is operated in the following manner. First, the thermometer is energized by pressing the measurement switch 5 thereby to start measurement of a temperature. The probe 2 is thereafter inserted into an external acoustic opening of a subject and directed to an eardrum and the eardrum temperature is measured. After the probe 2 is correctly directed to the eardrum, the probe 2 is taken out from the external acoustic opening. Since the liquid crystal display element 6 is capable of showing a maximum measured temperature, i.e., the eardrum temperature or a body temperature is displayed and the temperature thus displayed is read as the body temperature of the subject.

Figure 2:
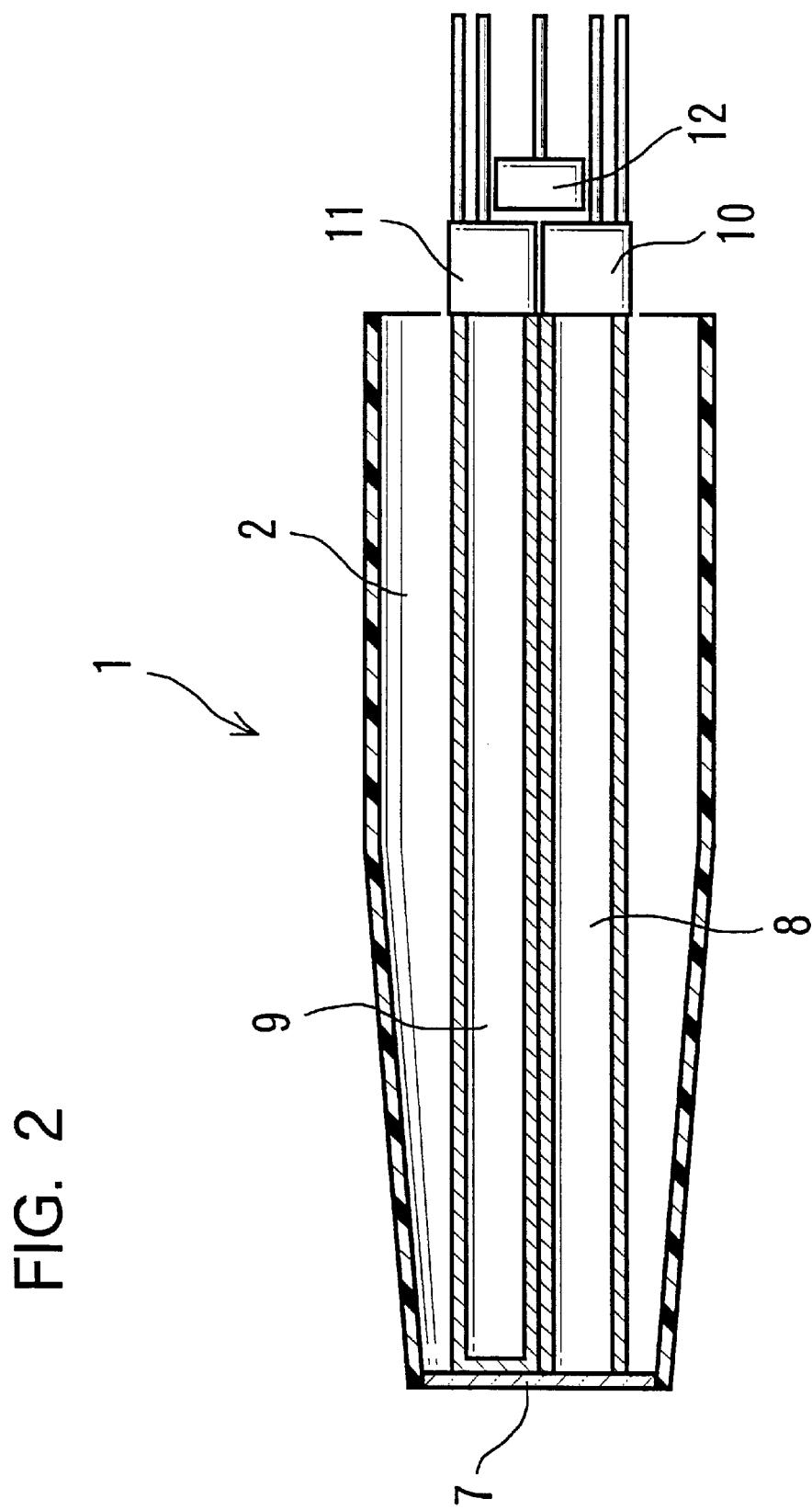
FIG. 2 is a cross sectional view of a probe portion of the radiation hermometer.

FIG. 2 is a cross sectional view of a portion of the probe 2 of the radiation thermometer 1 shown in FIG. 1.

A filter 7 which has a given wavelength transmission characteristic is disposed at the front end of the probe 2. The filter 7 is formed of an optical crystal such as silicon (Si) and barium fluoride ($BaF_2$) or a high polymer such as polyethylene, and has functions of selectively transmitting an infrared wavelength and excluding dust.

A light-guiding tube 8 is disposed for efficiently converging heat radiation from an eardrum of a measurement target. The light-guiding tube 8 is formed of a metal pipe such as copper, brass, stainless steel, or etc., and an inner surface of the light-guiding tube 8 is plated with gold (Au) like a mirror surface for the purpose of enhancing reflectance. However, since the inner surface of the light-guiding tube 8 cannot serve as a perfect reflector whose reflectance is 1.00 even with such plating, the inner surface of the light-guiding tube 8 has a certain reflectance.

A light-guiding tube 9 is formed of the same material as the light-guiding tube 8, and an inner surface of the light-guiding tube 9 is processed in a similar manner as that of the light-guiding tube 8. However, one end of the light-guiding tube 9 (which faces the filter 7) is blocked so that an infrared ray does not enter the light-guiding tube 9 from the measurement target. Further, the light-guiding tube 9 is disposed in the vicinity of the light-guiding tube 8, so that the light-guiding tube 9 has the same temperature as the light-guiding tube 8. It is required that the light-guiding tube 9 has the same temperature as the light-guiding tube 8, and therefore, it is not always necessary that the material and the condition of the inner surface of the light-guiding tube 9 are the same as those of the light-guiding tube 8.

A first infrared ray sensor 10 detects an infrared ray from a measurement target converged by the light-guiding tube 8, while detecting a heat radiation from the light-guiding tube 8 itself as well. On the other hand, the front end of the light-guiding tube 9 is closed. A second infrared ray sensor 11 detects heat radiation from the light-guiding tube 9 itself, as further, the second infrared ray sensor 11 is disposed in the vicinity of the first infrared ray sensor 10 so that the second infrared ray sensor 11 has the same temperature as the first infrared ray sensor 10. A temperature-sensitive sensor 12 is designed to measure temperatures of the first infrared ray sensor 10 and the second infrared ray sensor 11.

Now, principles of operations for the first infrared ray sensor 10 and the second infrared ray sensor 11 will be briefly described. If temperatures of the light-guiding tube 8 and the first infrared ray sensor 10 are the same on appearance, then the first infrared ray sensor 10 can measure only an infrared ray from the measurement target. This is because in spite of heat radiation also from the light-guiding tube 8, since a temperature of the light-guiding tube 8 is the same as a temperature of the first infrared ray sensor 10, the heat radiation from the light-guiding tube 8 can be ignored considering the balance between incidence upon and radiation from the first infrared ray sensor 10.

However, when there is a temperature difference between the light-guiding tube 8 and the first infrared ray sensor 10, a difference is resulted between heat radiation from the light-guiding tube 8 and heat radiation from the first infrared ray sensor 10, and hence, the first infrared ray sensor 10 will detect heat radiation from a measurement target and the heat radiation from the light-guiding tube 8. This means that the heat radiation from the light-guiding tube 8 cannot be disregarded.

To deal with this, the second infrared ray sensor 11 is provided in the radiation thermometer 1 in which the second infrared ray sensor 11 detects only an infrared ray from the light-guiding tube 9 which is of the same temperature condition as the light-guiding tube 8, that is, an infrared ray radiated from the optical system itself, and an output from the second infrared ray sensor 11 is subtracted at an appropriate rate from the output from the first infrared ray sensor 10 which is influenced by the temperature of the light-guiding tube 8, so that it is possible to detect an infrared ray from a measurement target which is not influenced by the temperature of the light-guiding tube 8.

Further, six types of adjustment which are simply listed below are performed in the radiation thermometer 1 shown in FIG. 1 in order to improve the temperature measurement accuracy. Each adjustment will be described later.

(1) Adjustment of temperature compensation of the optical system (hereinafter "RES adjustment" in case of necessity)

(2) Offset adjustment of amplifying circuits which amplify outputs from the infrared ray sensors (hereinafter "LEV adjustment" in case of necessity)

(3) Absolute value adjustment of a characteristic of the temperature-sensitive sensor (hereinafter "ABS adjustment" in case of necessity)

(4) Sensitivity adjustment of the temperature-sensitive sensor (hereinafter "SEN adjustment" in case of necessity)

(5) Sensitivity adjustment of the infrared ray sensors (hereinafter "KAN adjustment" in case of necessity)

(6) Adjustment of temperature characteristics (temperature dependencies) of the infrared ray sensors (hereinafter "DRI adjustment" in case of necessity)

Next, a structure of the radiation thermometer 1 which includes means associated with the six types of adjustment above will be described.

Figure 3:
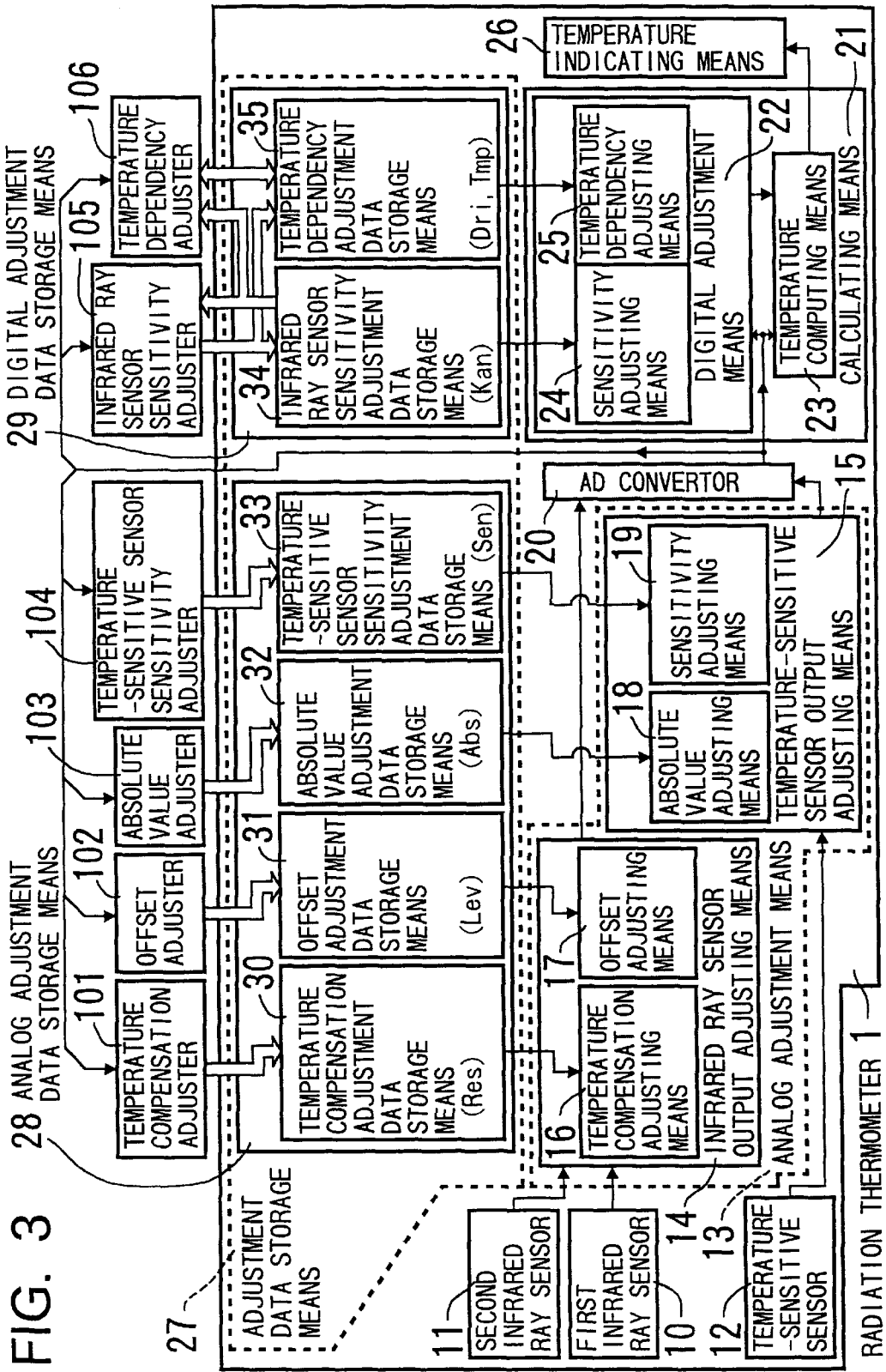
FIG. 3 is a block diagram showing a structure of the radiation thermometer shown in FIG. 1.

FIG. 3 is a block diagram showing a structure of the radiation thermometer 1 shown in FIG. 1.

The radiation thermometer 1 comprises analog adjustment means 13 which receives outputs from the first infrared ray sensor 10, the second infrared ray sensor 11 and the temperature-sensitive sensor 12, an AD convertor 20 for A/D converting an output from the analog adjustment means 13, calculating means 21 for calculating a body temperature based on an output from the AD convertor 20, temperature indicating means 26 for indicating to a user a body temperature found as a result of a calculation obtained by the calculating means 21, and adjustment data storage means 27 for storing adjustment data which are used in the analog adjustment means 13 and the computing means 21.

The temperature indicating means 26 comprises a display means for displaying a temperature using the liquid crystal display element 6 shown in FIG. 1 or the like and even a means for informing a temperature by voice.

The analog adjustment means 13 comprises infrared ray sensor output adjusting means 14 which receives outputs from the first infrared ray sensor 10 and the second infrared ray sensor 11, and temperature-sensitive sensor output adjusting means 15 which receives an output from the temperature-sensitive sensor 12. The infrared ray sensor output adjusting means 14 comprises temperature compensation adjusting means 16 and offset adjusting means 17. The temperature-sensitive sensor output adjusting means 15 comprises absolute value adjusting means 18 and sensitivity adjusting means 19.

The calculating means 21 comprises digital adjustment means 22 and temperature calculating means 23 which calculates a body temperature. The digital adjustment means 22 comprises sensitivity adjusting means 24 and temperature dependency adjusting means 25.

The adjustment data storage means 27 comprises analog adjustment data storage means 28 which stores analog adjustment data, and digital adjustment data storage means 29 which stores digital adjustment data. The analog adjustment data storage means 28 comprises temperature compensation adjustment data storage means 30, offset adjustment data storage means 31, absolute value adjustment data storage means 32 and temperature-sensitive sensor sensitivity adjustment data storage means 33, while the digital adjustment data storage means 29 comprises infrared ray sensor sensitivity adjustment data storage means 34 and temperature dependency adjustment data storage means 35.

In the first preferred embodiment, various adjusters for performing the adjustment above are disposed externally on the radiation thermometer 1. Namely, a temperature compensation adjuster 101, an offset adjuster 102, an absolute value adjuster 103, a temperature-sensitive sensor sensitivity adjuster 104, an infrared ray sensor sensitivity adjuster 105 and a temperature dependency adjuster 106. These adjusters receive target data which are determined by an output from the AD convertor 20 and a water tank temperature, black body data which are determined by a black body temperature, etc., and digitally write associated adjustment data, respectively, in the temperature compensation adjustment data storage means 30, the offset adjustment data storage means 31, the absolute value adjustment data storage means 32, the temperature-sensitive sensor sensitivity adjustment data storage means 33, the infrared ray sensor sensitivity adjustment data storage means 34 and the temperature dependency adjustment data storage means 35.

After adjustment of the radiation thermometer 1 is completed, the radiation thermometer 1 performs an operation based on adjustment data which are stored in the adjustment data storage means 27. Hence, the adjustment data storage means 27 cannot afford losing stored contents during replacement of batteries. In addition, since re-adjustment of an adjustment error is desired during production, a non-volatile memory which is rewritable is preferably used.

Figure 4:
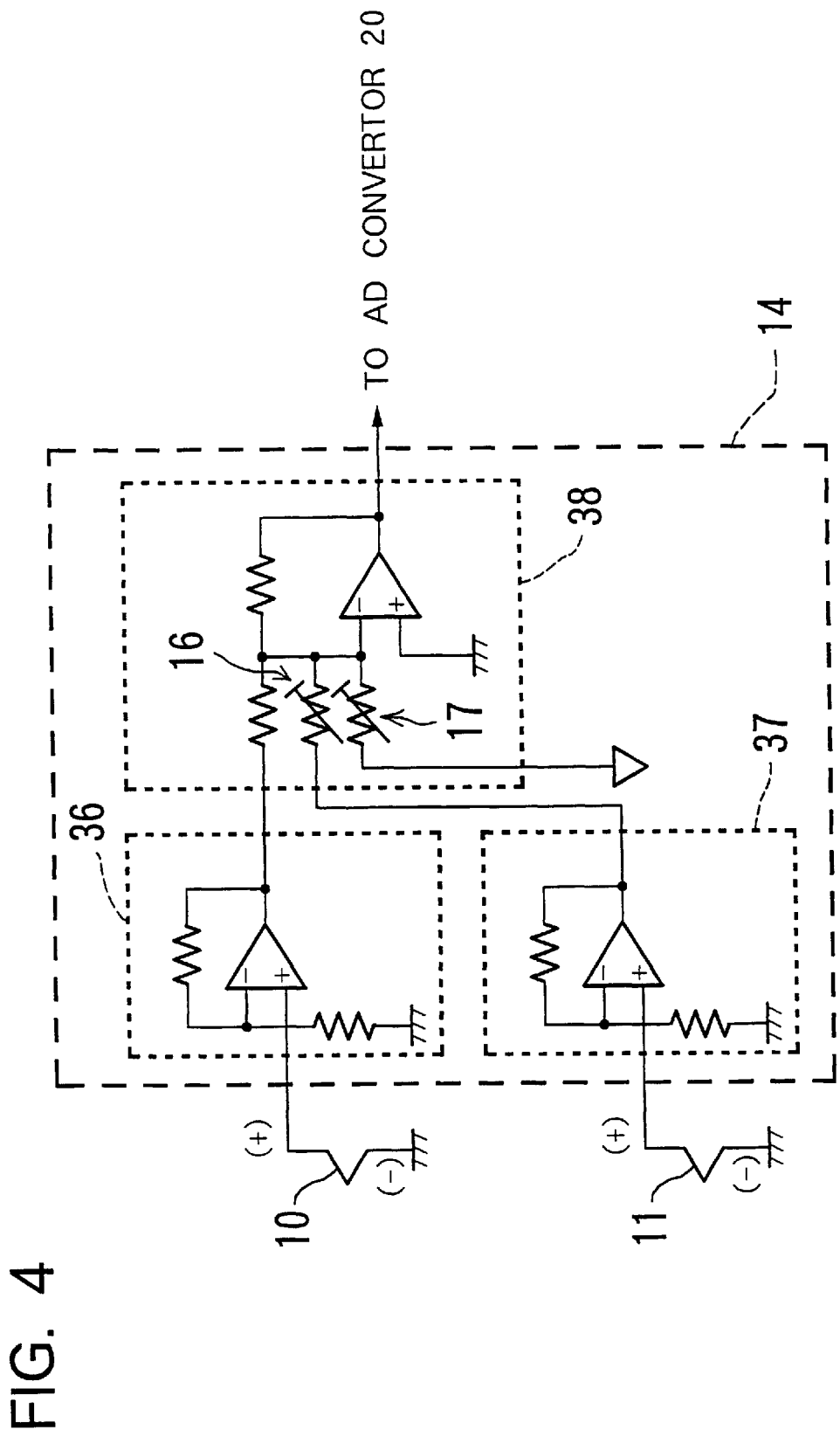
FIG. 4 is a circuitry diagram of infrared ray sensor output adjusting means shown in FIG. 3.

FIG. 4 is a circuitry diagram of the infrared ray sensor output adjusting means 14 shown in FIG. 3.

The temperature compensation adjusting means 16, the offset adjusting means 17 and the like shown in FIG. 3 are realized by variable resistors disposed within an addition circuit 38 which is shown in FIG. 4. The variable resistors which realize the temperature compensation adjusting means 16, the offset adjusting means 17 and the like are realized by variable resistors which can be varied from outside. Further, the infrared ray sensor output adjusting means 14 comprises amplifying means 36 which amplifies an output from the first infrared ray sensor 10 and amplifying means 37 which amplifies an output from the second infrared ray sensor 11.

Although the infrared ray sensor output adjusting means 14 is realized by the addition circuit 38 in the first preferred embodiment, since the second infrared ray sensor 11 which is fed to the addition circuit 38 has a different polarity from that of the first infrared ray sensor 10, the addition circuit 38 operates substantially to subtract an output from the second infrared ray sensor 11 from an output from the first infrared ray sensor 10. Further, while the amplifying means 36 and 37 are disposed, respectively, for outputs from the first infrared ray sensor 10 and the second infrared ray sensor 11, the amplifying means 36 and 37 may be omitted depending on levels of sensor outputs, a capability of the addition circuit 38, etc.

Figure 5:
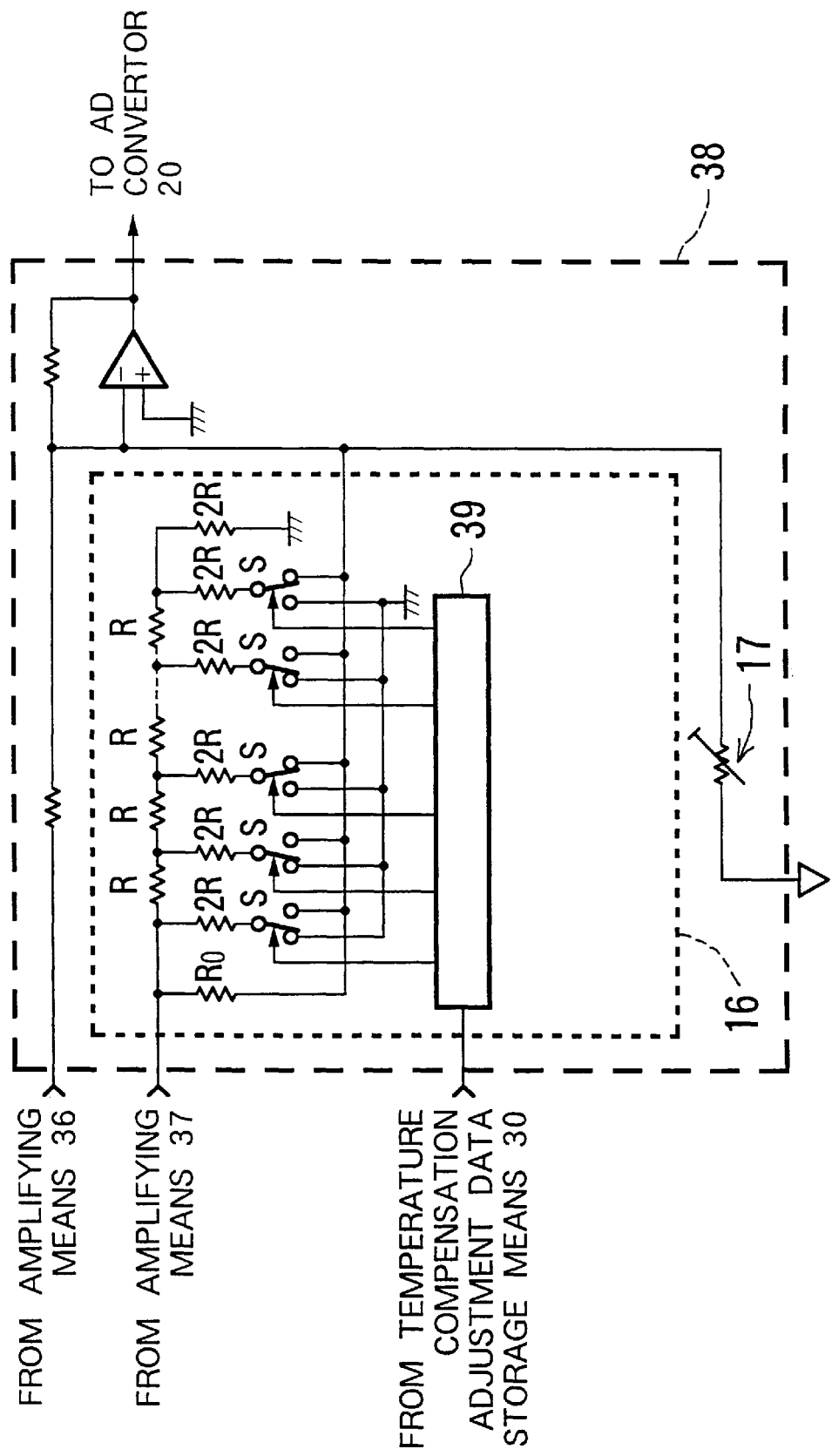
FIG. 5 is a circuitry diagram of an addition circuit shown in FIG. 4, particularly showing an example of temperature compensation adjusting means.

FIG. 5 is a circuitry diagram of the addition circuit 38 shown in FIG. 4, showing an example of the temperature compensation adjusting means 16.

With the temperature compensation adjusting means 16, as shown in FIG. 5, a well-known R-2R ladder resistor-type D-A convertor may be used.

Denoted at 39 is a buffer for ON/OFF control of switches S which are connected to the respective resistors based on adjustment data received from the temperature compensation adjustment data storage means 30. Because of the ON/OFF control, a combined resistance of the R-2R ladder resistor-type D-A convertor changes.

Although FIG. 5 shows one example of the details of the temperature compensation adjusting means 16, the offset adjusting means may be formed of an R-2R ladder resistor-type D-A convertor in a similar manner and a buffer may be disposed which controls ON/OFF of the switches S which are connected to the respective resistors based on adjustment data received from the offset adjustment data storage means 31 so that a combined resistance of the R-2R ladder resistor-type D-A convertor changes in accordance with the ON/OFF control.

Figure 6:
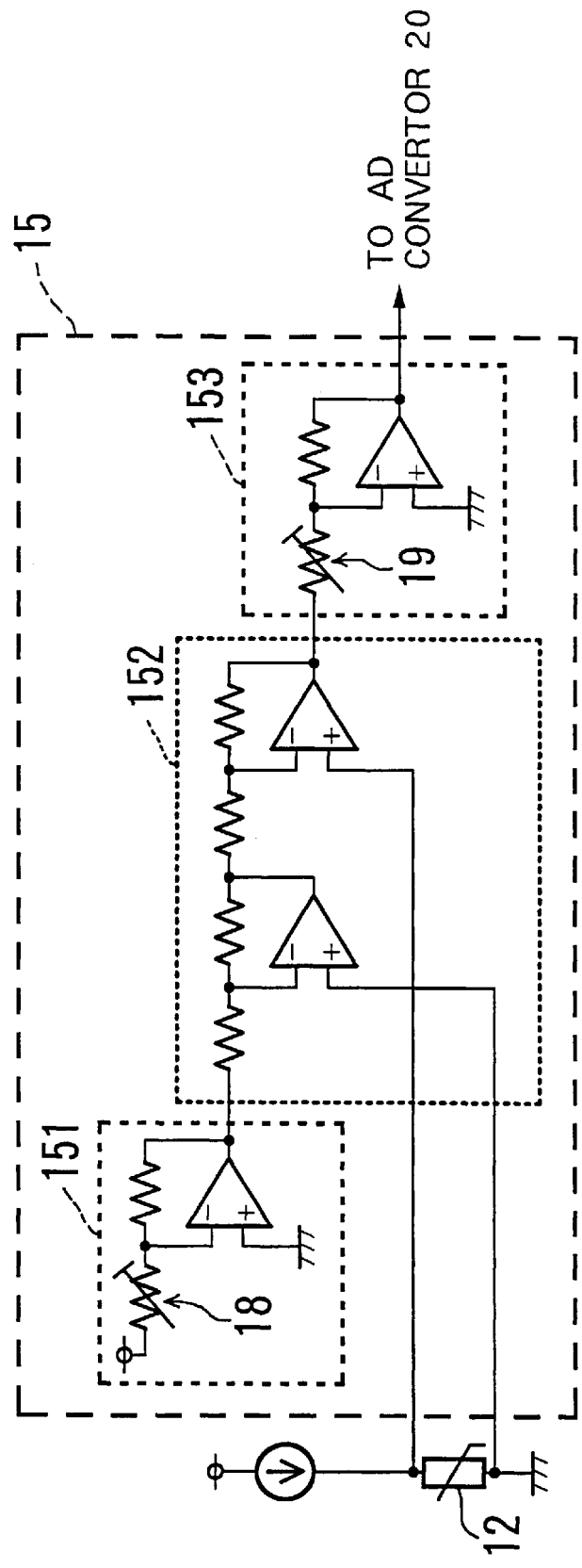
FIG. 6 is a circuitry diagram of temperature-sensitive sensor output adjusting means shown in FIG. 3.

FIG. 6 is a circuitry diagram of the temperature-sensitive sensor output adjusting means 15 shown in FIG. 3.

The temperature-sensitive sensor output adjusting means 15 comprises an inverted amplifying circuit 151, a differential amplifying circuit 152 and an inverted amplifying circuit 153. The absolute value adjusting means 18 shown in FIG. 3 is realized by a variable resistor disposed within the inverted amplifying circuit 151 shown in FIG. 6. Meanwhile, the sensitivity adjusting means 19 shown in FIG. 3 is realized by a variable resistor which is disposed within the inverted amplifying circuit 153 shown in FIG. 6.

Like the temperature compensation adjusting means 16 shown in FIG. 5, the absolute value adjusting means 18 as well may be formed by an R-2R ladder resistor-type D-A convertor and a buffer may be disposed which controls ON/OFF of the switches S which are connected to the respective resistors based on adjustment data received from the absolute value adjustment data storage means 32 so that a combined resistance of the R-2R ladder resistor-type D-A convertor changes in accordance with the ON/OFF control. In addition, like the temperature compensation adjusting means 16 shown in FIG. 5, the sensitivity adjusting means 19, as well, may be formed by an R-2R ladder resistor-type D-A convertor and a buffer may be disposed which controls ON/OFF of the switches S which are connected to the respective resistors based on adjustment data received from the temperature-sensitive sensor sensitivity adjustment data storage means 33 so that a combined resistance of the R-2R ladder resistor-type D-A convertor changes in accordance with the ON/OFF control.

In this manner, the analog adjustment means 13 which adjusts an output therefrom on the analog circuit is used in the first preferred embodiment.

FIG. 7 is a block diagram showing structures of the various adjusters shown in FIG. 3, wherein (a) shows a block diagram of an adjuster for writing adjustment data in the analog adjustment data storage means 28 and (b) shows a block diagram of an adjuster for writing adjustment data in the digital adjustment data storage means 29.

Figure 7A:
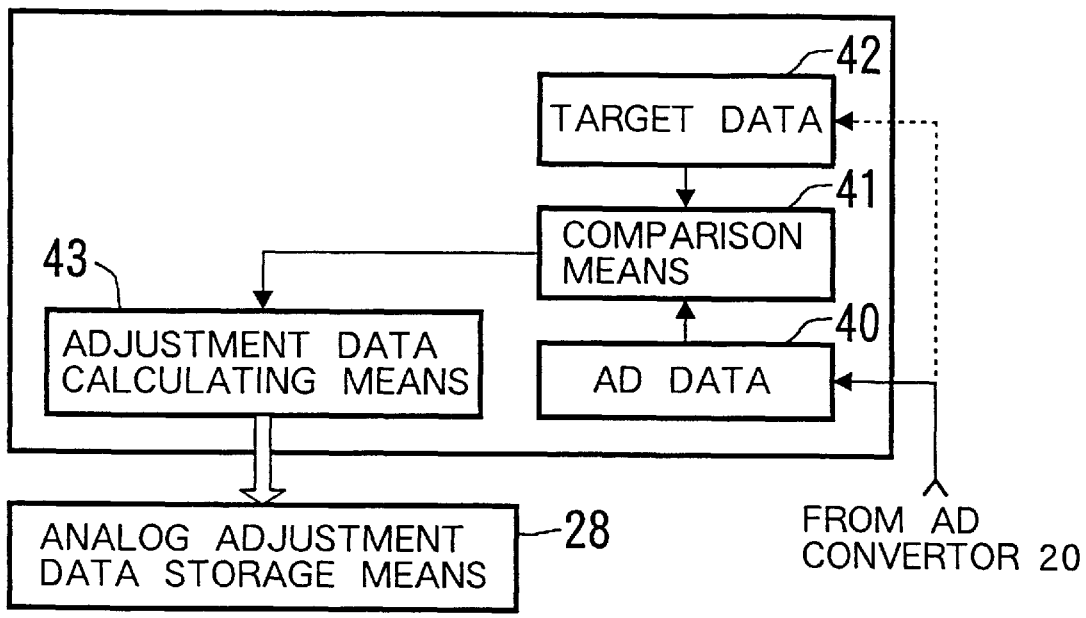
FIG. 7 is a block diagram showing structures of various adjusters shown in FIG. 3, wherein (a) shows a block diagram of an adjuster for writing adjustment data in analog adjustment data storage means and (b) shows a block diagram of an adjuster for writing adjustment data in digital adjustment data storage means.

As shown in FIG. 7(a), in the adjuster for writing adjustment data in the analog adjustment data storage means 28 (i.e., the temperature compensation adjuster 101, the offset adjuster 102, the absolute value adjuster 103 and the temperature-sensitive sensor sensitivity adjuster 104), comparison means 41 compares AD data 40 from the AD convertor 20 with target data 42, adjustment data calculating means 43 calculates adjustment data based on a comparison result, and the calculated adjustment data are stored in the analog adjustment data storage means 28. The AD data 40 are read from the AD convertor 20 once again and compared with the target data 42. This operation is repeated until a predetermined tolerance value is met.

Figure 7B:
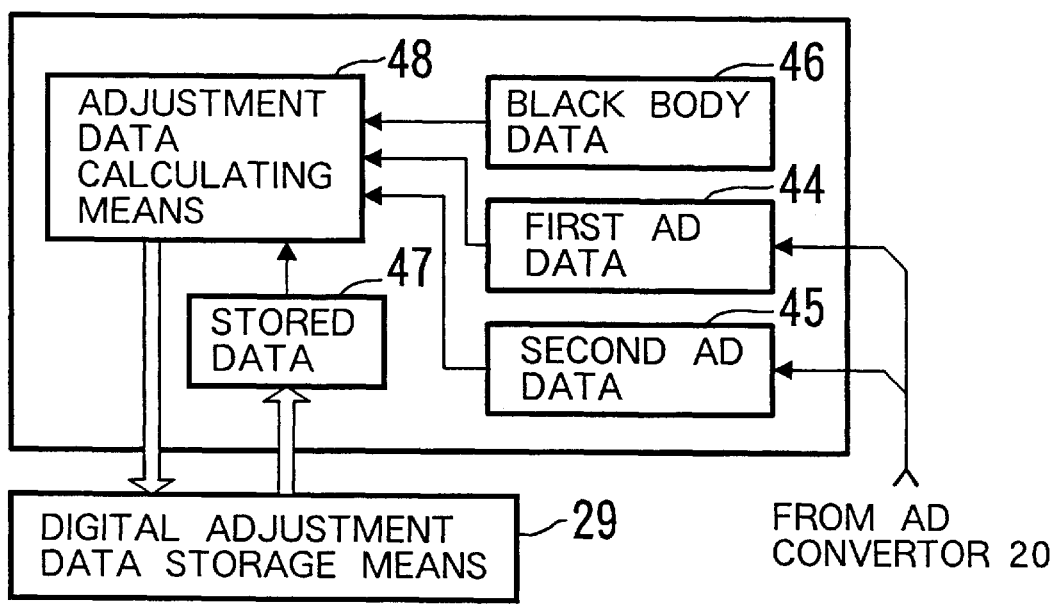

On the other hand, as shown in FIG. 7(b), the adjuster for writing adjustment data in the digital adjustment data storage means 29 (i.e., the infrared ray sensor sensitivity adjuster 105 and the temperature dependency adjuster 106) is structured such that adjustment data calculating means 48 calculates adjustment data based on first AD data 44 and second AD data 45 from the AD convertor 20, black body data 46 and stored data 47 which are stored in the digital adjustment data storage means 29 and the calculated adjustment data are stored in the digital adjustment data storage means 29. The black body data 46 are temperature data on a black body which serve as a reference for measurement of a temperature of a black body, which will be described in detail later.

Now, an example of a method of adjusting the radiation thermometer 1 according to the present invention will be described. Adjustment as herein mentioned is incorporated in assembly of the radiation thermometer 1, the amplifying circuits of the infrared ray sensors are adjusted in some cases with a fixed resistor connected for convenience instead of connecting the infrared ray sensors.

First, LEV adjustment, i.e., offset adjustment of the amplifying circuits which amplify outputs from the infrared ray sensors, is performed.

LEV adjustment adjusts an offset in the addition circuit 38 in a case where outputs from the first infrared ray sensor 10 and the second infrared ray sensor 11 shown in FIG. 4 are zero, so that an output from the addition circuit 38 becomes a target voltage which serves as a reference. More precisely, instead of the first infrared ray sensor 10 and the second infrared ray sensor 11, fixed resistors whose resistances are approximately the same as those of the infrared ray sensors 10 and 11 are temporarily connected. A value which is obtained by digitally converting an output from the infrared ray sensor output adjusting means 14 by the AD convertor 20 is thereafter supplied to the offset adjuster 102, and the offset adjuster 102 regards the inputted value as the AD data 40 which are shown in FIG. 7(*a*). For making the AD data 40 match the target data 42 which are reference values, the adjustment data calculating means 43 calculates a resistance of the offset adjusting means 17 and data to be fed to the R-2R ladder resistor-type D-A convertor, and resulting adjustment data are written in the offset adjustment data storage means 31.

Figure 8A:
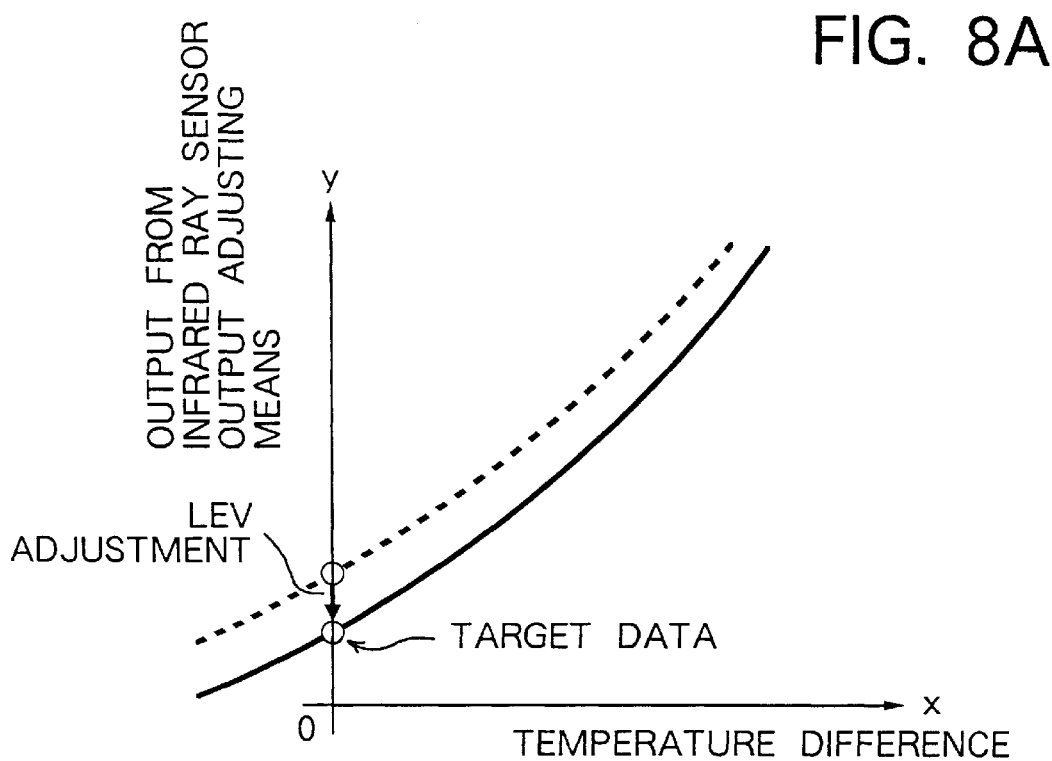
FIG. 8(a) is a graph describing LEV adjustment.
Figure 8B:
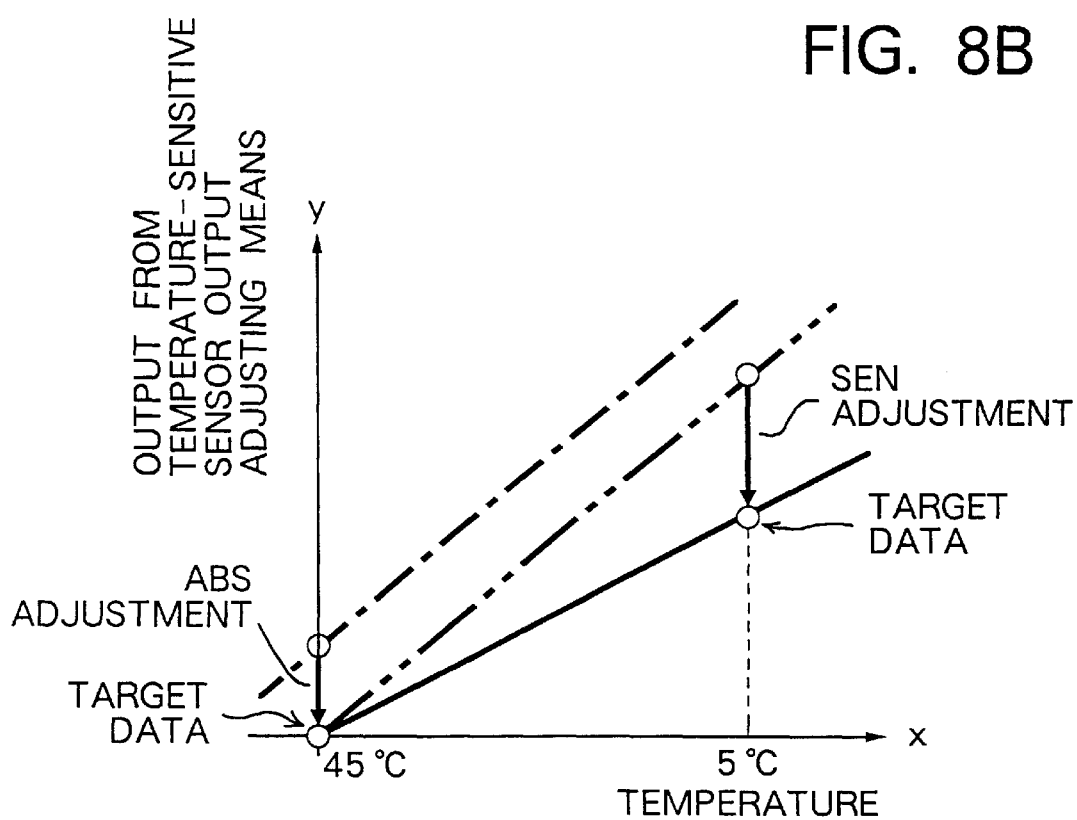
FIG. 8(b) is a graph describing ABS adjustment and SEN adjustment.

Referring to the graph in which the X-axis shows a temperature difference between a temperature of the first infrared ray sensor 10 and a temperature of a black body which is a measurement target and the Y-axis shows an output from the infrared ray sensor output adjusting means 14 (See FIG. 8(*a*)), LEV adjustment is an adjustment which shifts a characteristic in parallel to the direction of the Y-axis. In FIG. 8(*a*), the dotted line indicates a characteristic prior to LEV adjustment, whereas the solid line indicates a characteristic after LEV adjustment. In this graph, an output from the second infrared ray sensor 11 is treated as zero.

Next, ABS adjustment, i.e., absolute value adjustment of a characteristic of the temperature-sensitive sensor is performed. This is to adjust a high temperature range of an ambient temperature.

More particularly, a water tank which is maintained at 45° C., for instance, is used. The temperature-sensitive sensor 12 shown in FIG. 6 is placed in the water tank and kept so as to have the same temperature as the temperature of the water tank. A value which is obtained by digitally converting an output from the temperature-sensitive sensor output adjusting means 15 at this point by the AD convertor 20 is supplied to the absolute value adjuster 103, and the absolute value adjuster 103 regards the inputted value as the AD data 40 which is shown in FIG. 7(*a*). For making the AD data 40 match the target data 42 which are reference values (i.e., 45° C. which is the temperature of the water tank), the adjustment data calculating means 43 calculates a resistance of the absolute value adjusting means 18 and data to be fed to the R-2R ladder resistor-type D-A convertor, and the resulting adjustment data are written in the absolute value adjustment data storage means 32.

Referring to the graph in which the X-axis shows a temperature of the measurement target to be measured by the temperature-sensitive sensor 12 and the Y-axis shows an output from the temperature-sensitive sensor output adjusting means 15 (See FIG. 8(*b*)), ABS adjustment is an adjustment which shifts a characteristic in parallel to the direction of the Y-axis. In FIG. 8(*b*), the slash-dot-slash line indicates a characteristic prior to ABS adjustment, whereas the slash-dot-dot-slash line indicates a characteristic after ABS adjustment.

Next, SEN adjustment, i.e., sensitivity adjustment of the temperature-sensitive sensor is performed. This is to adjust a low temperature range of an ambient temperature.

That is, a water tank which is maintained at 5° C., for instance, is used. The temperature-sensitive sensor 12 shown in FIG. 6 is placed in the water tank and kept so as to have the same temperature as the temperature of the water tank. A value which is obtained by digitally converting an output from the temperature-sensitive sensor output adjusting means 15 at this point by the AD convertor 20 is supplied to the temperature-sensitive sensor sensitivity adjuster 104, and the temperature-sensitive sensor sensitivity adjuster 104 regards the inputted value as the AD data 40 which is shown in FIG. 7(*a*). For making the AD data 40 match the target data 42 which are reference values (i.e., 5° C. which is the temperature of the water tank), the adjustment data calculating means 43 calculates a resistance of the sensitivity adjusting means 19 and data to be fed to the R-2R ladder resistor-type D-A convertor, and the resulting adjustment data are written in the temperature-sensitive sensor sensitivity adjustment data storage means 33.

Referring to the graph in which the X-axis shows a temperature of the measurement target to be measured by the temperature-sensitive sensor 12 and the Y-axis shows an output from the temperature-sensitive sensor output adjusting means 15 (See FIG. 8(*b*)), SEN adjustment is an adjustment which changes and adjusts the gradient of a characteristic. In FIG. 8(*b*), the slash-dot-dot-slash line indicates a characteristic prior to SEN adjustment, whereas the solid line indicates a characteristic after SEN adjustment.

For ease in measurement of adjustment and other conveniences, LEV adjustment, ABS adjustment and SEN adjustment described above are preferably executed before the probe 2, which comprises the first infrared ray sensor 10, the second infrared ray sensor 11 and an optical system such as the light-guiding tubes 8 and 9 shown in FIG. 2, is attached to the board of the radiation thermometer 1.

A structure which is effective to increase the heat capacity of the temperature-sensitive sensor 12 and to insulate the temperature-sensitive sensor 12 from the probe 2 is adopted for the probe 2 which comprises the first infrared ray sensor 10, the second infrared ray sensor 11 and an optical system such as the light-guiding tubes 8 and 9. On the other hand, ABS adjustment and SEN adjustment are executed after placing the temperature-sensitive sensor 12 in the water tank and matching the temperature of the temperature-sensitive sensor 12 to the temperature of the water tank.

Such structure for increasing the heat capacity of the temperature-sensitive sensor 12 and for heat insulation thereof may extend time needed for adjustment. Hence, it is preferable to execute ABS adjustment and KAN adjustment before attaching the probe 2.

Since LEV adjustment is used where outputs from the first infrared ray sensor 10 and the second infrared ray sensor 11 are zero, after the infrared ray sensors 11 and 12 are actually incorporated, it is extremely difficult to ensure that outputs from the infrared ray sensors 11 and 12 are zero. Because of this, it is desirable to create a condition using fixed resistors before attaching the infrared ray sensors 11 and 12 and to thereafter execute adjustment.

Adjustment after this stage is executed after the probe 2, which comprises the first infrared ray sensor 10, the second infrared ray sensor 11 and an optical system such as the light-guiding tubes 8 and 9 shown in FIG. 2, is attached to the board of the radiation thermometer 1.

Next, RES adjustment, i.e., adjustment of temperature compensation of the optical system is carried out.

More specifically, a black body which is at a predetermined temperature, for example, is used and the temperature of the black body is measured in a condition where the probe 2, which comprises the first infrared ray sensor 10, the second infrared ray sensor 11 and an optical system such as the temperature-sensitive sensor 12 and the light-guiding tubes 8 and 9 shown in FIG. 2, is attached, whereby RES adjustment is executed. First, in a condition where temperatures of these elements are approximately the same, with the probe 2 directed toward the black body, output from the AD convertor 20 is monitored. Following this, with the probe 2 gradually heated for about 60 seconds to a proper temperature, the probe 2 is directed toward the black body again and output from the AD convertor 20 is monitored. Meanwhile, adjustment is performed such that displays on the temperature indicating means 26 do not change before or after heating. That is, the output from the AD convertor 20 before heating is supplied to the temperature compensation adjuster 101 and the temperature compensation adjuster 101 regards the input as the target data 42 shown in FIG. 7(a), the output from the AD convertor 20 after heating is then supplied to the temperature compensation adjuster 101 and the temperature compensation adjuster 101 regards the input as the AD data 40 shown in FIG. 7(a), the adjustment data calculating means 43 calculates a resistance of the temperature compensation adjusting means 16 and data which are to be supplied to the R-2R ladder resistor-type D-A convertor such that the AD data 40 match the target data 42, and the resulting adjustment data are written in the temperature compensation adjustment data storage means 30.

Next, KAN adjustment, i.e., sensitivity adjustment of the infrared ray sensors is executed, following which DRI adjustment, i.e., adjustment of temperature characteristics (temperature dependencies) of the infrared ray sensors is executed.

KAN adjustment and DRI adjustment are for obtaining correction data which are used to correct a processing result of calculation of a temperature of a measurement target which is performed by the temperature calculation means 23 based on an output from the AD convertor 20, and thereby an accurate temperature. Now, calculation performed by the temperature dependency adjusting means 25, the sensitivity adjusting means 24 and the temperature calculating means 23 will be described.

$$D = 1 + Dri \cdot (T_0 - Tmp) \tag{1}$$

In equation (1), the symbol D indicates an infrared ray sensitivity correction rate which is used in an equation (2), the symbol Dri indicates temperature dependency adjustment data which are stored in the temperature dependency adjustment data storage means 35, the symbol $T_0$ indicates data which are obtained by digitally converting an output from the temperature-sensitive sensor output adjusting means 15, and Tmp indicates data which are obtained by digitally converting an output from the temperature-sensitive sensor output adjusting means 15 as it is stored in the temperature dependency adjustment data storage means 35 during KAN adjustment.

$$V = \frac{Vd}{D \cdot Kan} \tag{2}$$

In equation (2), the symbol V indicates infrared ray sensor correction data which are used in equation (3), the symbol Vd indicates data which are obtained by digitally converting an output from the infrared ray sensor output adjusting means 14, and the symbol Kan indicates infrared ray sensor sensitivity adjustment data which are stored in the infrared ray sensor sensitivity adjustment data storage means 34.

$$T = \sqrt[4]{V + T_0^4} \tag{3}$$

In the equation (3), the symbol T indicates output data of the temperature computing means 23, which is the temperature of a measurement target indicated by the temperature indicating means 26.

The temperature dependency adjusting means 25 performs the computation expressed in equation (1), the sensitivity adjusting means 24 performs the calculation expressed in equation (2), and the temperature calculating means 23 performs the calculation expressed in equation (3).

Further, equation (4) is obtained by eliminating V and D from equations (1), (2) and (3). The calculating means 21 performs the calculation expressed in equation (4).

$$T = \sqrt[4]{\frac{Vd}{Kan \cdot \{1 + Dri \cdot (T_0 - Tmp)\}} + T_0^4} \tag{4}$$

During KAN adjustment, data which are obtained by digitally converting an output from the temperature-sensitive sensor output adjusting means 15 are written in the temperature dependency adjustment data storage means 35 as Tmp and $T_0$=Tmp is applied to equation (4) to thereby find infrared ray sensor sensitivity adjustment data Kan and write the infrared ray sensor sensitivity adjustment data in the infrared ray sensor sensitivity adjustment data storage means 34. Meanwhile, during DRI adjustment, Kan calculated during KAN adjustment is substituted in equation (4) to thereby find temperature dependency adjustment data Dri and write the temperature dependency adjustment data in the temperature dependency adjustment data storage means 35.

Now, a specific method of executing KAN adjustment will be described.

KAN adjustment is preferably executed in two steps, namely rough adjustment and fine adjustment. After KAN rough adjustment, the board which mounts the optical system and the like is attached to the case of the radiation thermometer, and KAN fine adjustment is executed with the radiation thermometer thus completed.

First, KAN rough adjustment will be described. Adjustment work is performed within a homoiothermal bath or room in which environmental temperature is set to 16° C. A black body which is at 38° C. is placed in the homoiothermal bath or room.

An output from the AD convertor 20 at this stage is supplied to the infrared ray sensor sensitivity adjuster 105. Of inputs thereto, the infrared ray sensor sensitivity adjuster 105 regards data which are obtained by digitally converting an output from the infrared ray sensor output adjusting means 14 by the AD convertor 20 as the first AD data 44 which are shown in FIG. 7(b), and data which are obtained by digitally converting an output from the temperature-sensitive sensor output adjusting means 15 by the AD convertor 20 as the second AD data 45 which are shown in FIG. 7(b), for example. In addition, the infrared ray sensor sensitivity adjuster 105 uses the temperature of the black body (i.e., 38° C.) described above as the black body data 46 which are shown in FIG. 7(b).

Treating the second AD data 45 (i.e., 16° C. which is the environmental temperature) as the data Tmp which are obtained by digitally converting the output from the temperature-sensitive sensor output adjusting means 15 as it is during KAN adjustment, the adjustment data calculating means 48 of the infrared ray sensor sensitivity adjuster 105 writes the second AD data 45 in the temperature dependency adjustment data storage means 35.

Since $T_0$=Tmp for equation (4) during KAN adjustment, equation (5) for calculating Kan holds independently of Dri.

$$Kan = \frac{Vd}{(T^4 - T_0^4)} \quad (5)$$

The adjustment data calculating means 48 of the infrared ray sensor sensitivity adjuster 105 calculates Kan by equation (5), using the first AD data 44 as Vd in equation (5), the second AD data 45 as $T_0$ in equation (5) and the black body data 46 as T in equation (5). The adjustment data calculating means 48 of the infrared ray sensor sensitivity adjuster 105 then writes the result of the calculation in the infrared ray sensor sensitivity adjustment data storage means 34 as the infrared ray sensor sensitivity adjustment data.

Next, as described earlier, the board which mounts the optical system and the like is attached to the case of the radiation thermometer, and KAN fine adjustment is executed with the radiation thermometer thus completed.

Now, the necessity of performing KAN adjustment after incorporation to the case of the radiation thermometer will be described.

The amplifying means 36 and 37, which, respectively, amplify outputs from the first infrared ray sensor 10 and the second infrared ray sensor 11, have large gains. The gains sometimes change to some extent, depending on the method of fixing the board. For example, between a case where a prober pin is abutted to the amplifying means 36 and 37 to connect the amplifying means 36 and 37 as they are mounted on a board with the adjusters and a case where the amplifying means 36 and 37 are fixed as they are completed to a case, the gains of the amplifying means 36 and 37 may change to some extent.

Next, KAN fine adjustment will be described. First, with environmental temperature set to 16° C. and using a black body which is at 38° C., for example, the temperature of the black body is inspected with the radiation thermometer 1 built in a case. An operator who is conducting an adjustment enters a deviation ΔE between a temperature which is indicated by the temperature indicating means 26 and the actual temperature of the black body (i.e., 38° C.) to the infrared ray sensor sensitivity adjuster 105. In addition, the operator enters Kan (rough) which were already written during KAN rough adjustment are also supplied to the infrared ray sensor sensitivity adjuster 105. The adjustment data calculating means 48 of the infrared ray sensor sensitivity adjuster 105 performs the computation expressed as in equation (6) and obtains Kan (fine) which is the infrared ray sensor sensitivity adjustment data which are obtained as a result of KAN fine adjustment.

$$Kan(fine) = Kan(rough) \times T \frac{(T + \Delta E)^4 - T^4}{T^4 - T_0^4} \quad (6)$$

In equation (6), the symbol Kan (rough) indicates Kan which is obtained as a result of KAN rough adjustment. Kan (rough) is read from the infrared ray sensor sensitivity adjustment data storage means 34 as the stored data 47 which are shown in FIG. 7(b). Meanwhile, the symbol T indicates 38° C., i.e., the temperature of the black body. The symbol $T_0$ indicates 16° C., i.e., the environmental temperature. The symbol Kan (fine) indicates the infrared ray sensor sensitivity adjustment data which are obtained as a result of KAN fine adjustment. The adjustment data calculating means 48 of the infrared ray sensor sensitivity adjuster 105 writes the result of the calculation expressed in equation (6) in the infrared ray sensor sensitivity adjustment data storage means 34 as the infrared ray sensor sensitivity adjustment data.

Next, a specific method of executing DRI adjustment will be described. First, with environmental temperature set to the normal temperature and using a black body which is at 38° C., for example, the temperature of the black body is inspected with the radiation thermometer 1 thus completed. The following equation (7) is derived by solving equation (4) with respect to Dri:

$$Dri = \frac{1}{T_0 - Tmp} \cdot \left\{ \frac{Vd}{Kan \cdot (T^4 - T_0^4)} - 1 \right\} \quad (7)$$

The adjustment data calculating means 48 of the temperature dependency adjuster 106 reads Kan which is stored in the infrared ray sensor sensitivity adjustment data storage means 34 and Tmp which is stored in the temperature dependency adjustment data storage means 35 and substitutes the two values in equation (7). In addition, the adjustment data calculating means 48 of the temperature dependency adjuster 106 substitutes the first AD data 44 as Vd in equation (7), the second AD data 45 as $T_0$ in equation (7) and the black body data 46 as T in equation (7). The adjustment data calculating means 48 of the temperature dependency adjuster 106 thereafter calculates the temperature dependency adjustment data Dri.

As another method for calculating Dri, Dri may be obtained from deviation ΔE between a temperature which is indicated by the temperature indicating means 26 of the radiation thermometer 1 and an actual temperature of the black body, like the adjustment procedures of KAN fine adjustment.

The adjustment data calculating means 48 of the temperature dependency adjuster 106 thereafter writes the result of the calculation in the temperature dependency adjustment data storage means 35 as the temperature dependency adjustment data.

This completes adjustment of the radiation thermometer 1. After this, the radiation thermometer 1 operates based on the adjustment data which are written in the adjustment data storage means 27, thereby realizing highly accurate temperature measurement.

Although the method of adjusting the radiation thermometer according to the preferred embodiment described above requires performing adjustment in the order of LEV adjustment, ABS adjustment, SEN adjustment, RES adjustment, KAN adjustment and DRI adjustment, the present invention is not limited to this. In the following, conditions of the order of the respective adjustment will be described.

It is preferable to first perform ABS adjustment and SEN adjustment before KAN adjustment. The infrared ray sensor receives from a measurement target an infrared ray which corresponds to a temperature difference between temperatures of the infrared ray sensor itself and the temperature of the measurement target and output the intensity of the infrared ray. Hence, if the temperatures of the infrared ray sensor itself are not measured, it is impossible to find the temperature of the measurement target based on outputs from the infrared ray sensor. For this reason, ABS adjustment and SEN adjustment, i.e., adjustment of the temperature-sensitive sensor, are preferably executed before KAN adjustment. This is also related to the structure and assembly of the radiation thermometer. KAN adjustment is performed with the probe, which comprises the infrared ray sensor and the optical system such as the light-guiding tubes, attached to the board of the radiation thermometer. The optical system has a structure which increases the heat capacity of the temperature-sensitive sensor 12 and insulates the temperature-sensitive sensor 12 from the probe 2. On the other hand, ABS adjustment and SEN adjustment are performed with the temperature-sensitive sensor 12 placed in the water tank and the temperature of the temperature-sensitive sensor 12 matched to the temperature of the water tank. The insulation structure and increase in the heat capacity of the temperature-sensitive sensor 12 may extends the time needed for adjustment. Hence, it is preferable to execute ABS adjustment and SEN adjustment before KAN adjustment.

It is preferable to thereafter perform LEV adjustment before KAN adjustment. Since KAN adjustment is performed on the premise that adjustment (LEV adjustment) is completed whereby outputs from the infrared ray sensors are zero when a temperature difference between a measurement target and the infrared ray sensors is zero, LEV adjustment is preferably conducted before KAN adjustment. LEV adjustment and ABS adjustment are not relevant to each other, and therefore, either one of LEV adjustment and ABS adjustment maybe executed before the other.

It is preferable to thereafter perform ABS adjustment before SEN adjustment. Referring to the graph in which the X-axis shows the temperature of a measurement target which is to be measured by the temperature-sensitive sensor 12 and the Y-axis shows an output from the temperature-sensitive sensor output adjusting means 15 described earlier, ABS adjustment is to shift a characteristic in a parallel direction to the Y-axis and accordingly adjust the characteristic. Meanwhile, SEN adjustment is to change and adjust the gradient of this graph. Hence, if SEN adjustment precedes ABS adjustment, an output as it is obtained when the temperature is 5° C. during SEN adjustment is shifted.

Furthermore, LEV adjustment only needs to be performed before KAN adjustment, and therefore, may be before or after ABS adjustment or before or after SEN adjustment.

It is preferable to thereafter perform RES adjustment before KAN adjustment. KAN adjustment is influenced by heat balance of the optical system (i.e., a balance in temperature difference between the light-guiding tubes, etc., and the infrared ray sensors). If the heat balance of the optical system is in equilibrium (i.e., a temperature difference between the light-guiding tubes, etc., and the infrared ray sensors is zero) at the time of KAN adjustment, RES adjustment may be conducted after KAN adjustment. However, it is difficult to keep the heat balance of the optical system in equilibrium at the time of KAN adjustment, even if the optical system is linked by a metal housing whose thermal conductivity is excellent. This is extremely difficult if the optical system is not linked by a metal housing. Hence, if RES adjustment is executed before KAN adjustment such that a loss in heat balance if any can be compensated, even in a condition where the heat balance is lost, it is possible to perform KAN adjustment.

It is preferable to thereafter perform KAN adjustment before DRI adjustment. The sensitivities of the infrared ray sensors are adjusted in a low temperature environment (e.g., at 16° C.) during KAN adjustment. In DRI adjustment, a temperature is inspected in a normal temperature environment, and in accordance with the result, temperature coefficients of the sensitivities are adjusted if adjustment of the sensitivities are necessary. That is, sensitivities at a certain environmental temperature are found in KAN adjustment and sensitivities at other environmental temperatures are found in DRI adjustment, and if adjustment is necessary, a gradient between these two points is calculated and adjusted.

Figure 9:
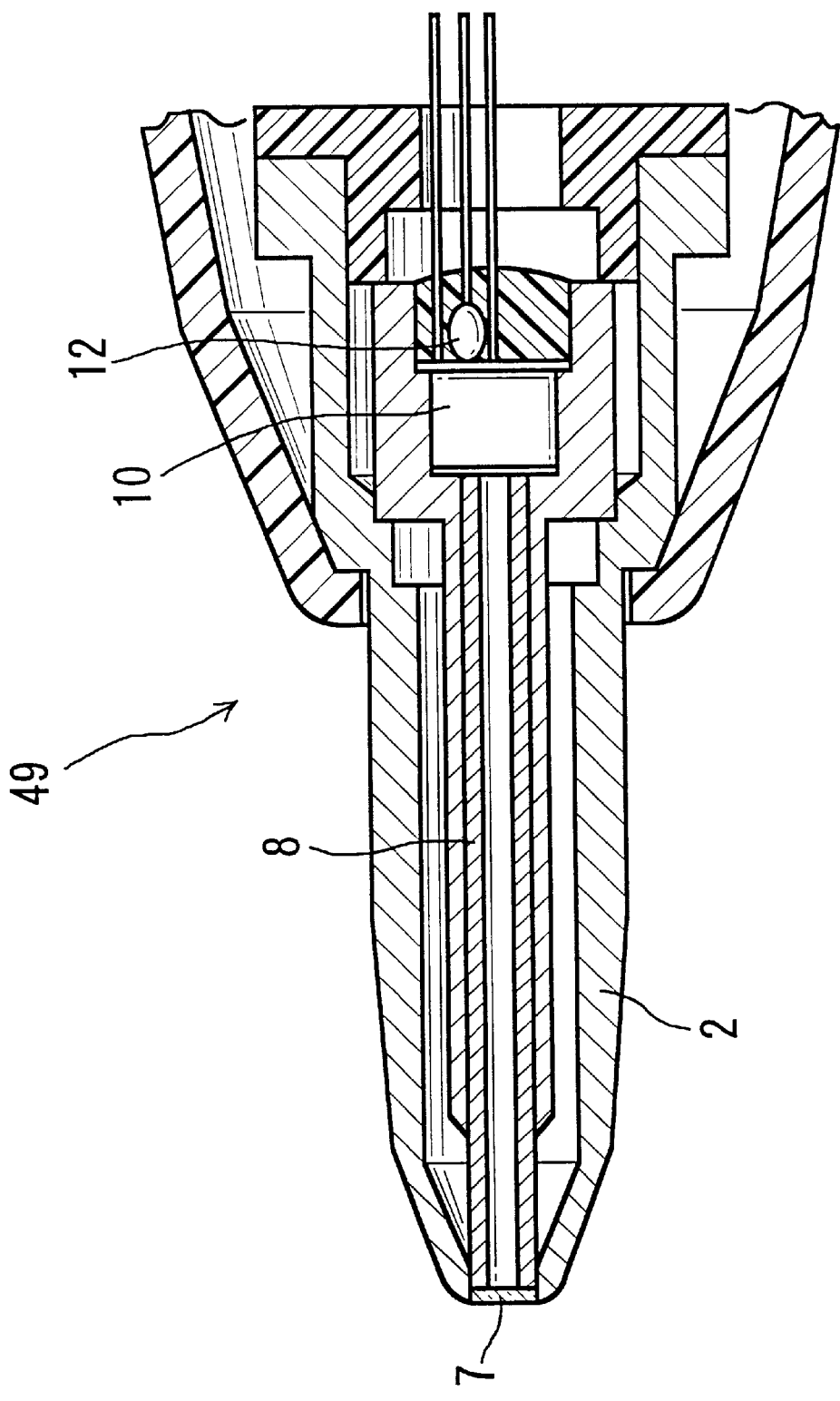
FIG. 9 is a cross sectional view of a probe portion of a radiation thermometer according to a second preferred embodiment of the present invention.

FIG. 9 is a cross sectional view of a portion of the probe of a radiation thermometer according to a second preferred embodiment of the present invention. In FIG. 9, structure portions which are the same as those shown in FIG. 2 are indicated with the same reference symbols, and therefore, will not be described.

A radiation thermometer 49 realizes basic functions of a radiation thermometer which measures a temperature on the premise that heat balance of the optical system is in equilibrium.

Figure 10:
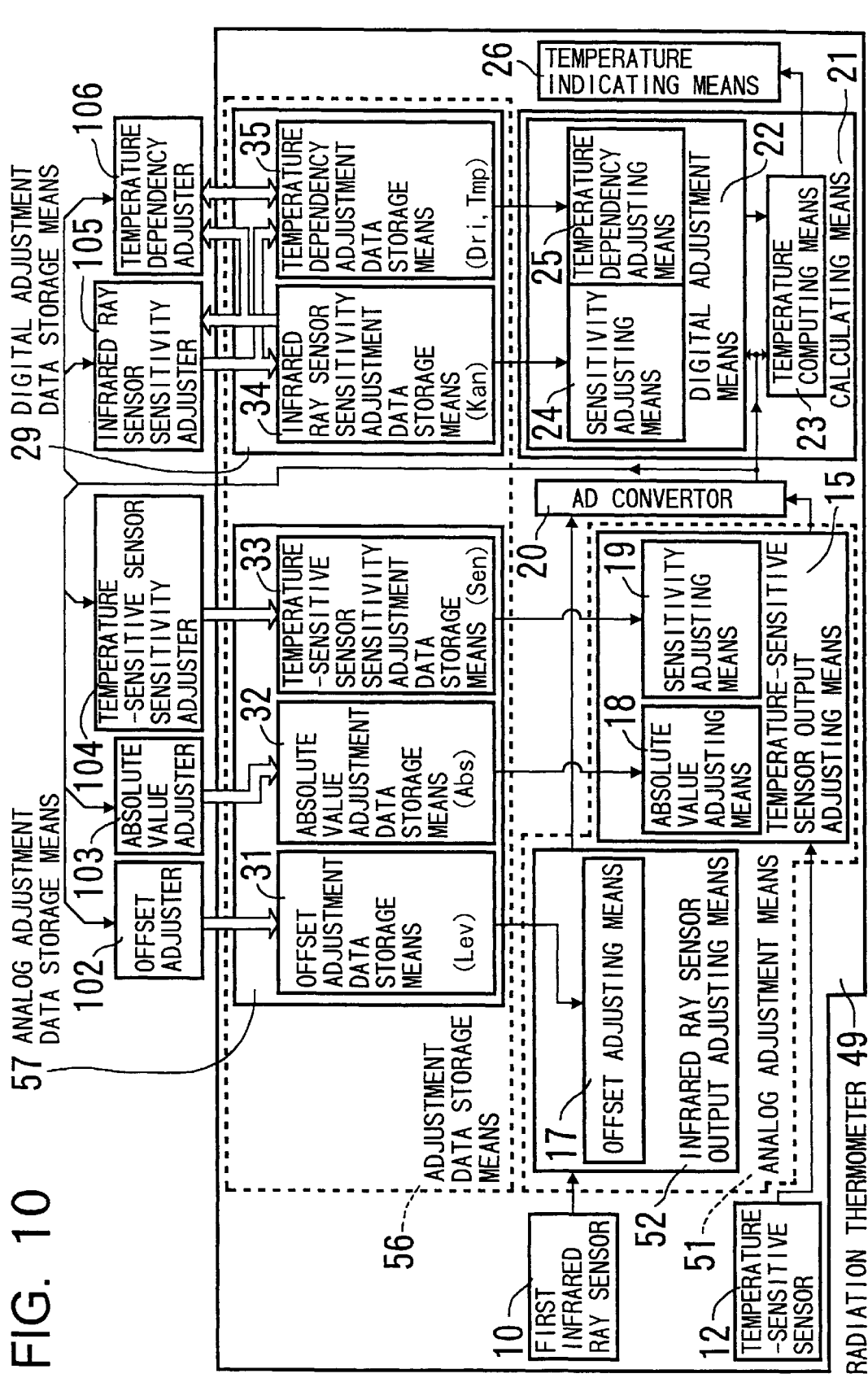
FIG. 10 is a block diagram showing a structure of the radiation thermometer shown in FIG. 9.

FIG. 10 is a block diagram showing a structure of the radiation thermometer 49 shown in FIG. 9. In FIG. 10, structural components which are the same as those shown in FIG. 3 are indicated with the same reference symbols, and therefore, will not be described.

The radiation thermometer 49 comprises analog adjustment means 51 which receives outputs from the first infrared ray sensor 10 and the temperature-sensitive sensor 12, the AD convertor 20 for A/D converting an output from the analog adjustment means 51, the computing means 21 for calculating a body temperature based on an output from the AD convertor 20, the temperature indicating means 26 for informing a user of a body temperature which is found as a result of a computation obtained by the computing means 21, and adjustment data storage means 56 for storing adjustment data which are used in the analog adjustment means 51 and the computing means 21.

The analog adjustment means 51 comprises infrared ray sensor output adjusting means 52 which receives output from the first infrared ray sensor 10, and the temperature-sensitive sensor output adjusting means 15 which receives output from the temperature-sensitive sensor 12. The infrared ray sensor output adjusting means 52 comprises the offset adjusting means 17.

The adjustment data storage means 56 comprises analog adjustment data storage means 57 which stores analog adjustment data, and the digital adjustment data storage means 29 which stores digital adjustment data. The analog adjustment data storage means 57 comprises the offset adjustment data storage means 31, the absolute value adjustment data storage means 32 and the temperature-sensitive sensor sensitivity adjustment data storage means 33, while the digital adjustment data storage means 29 comprises the infrared ray sensor sensitivity adjustment data storage means 34 and the temperature dependency adjustment data storage means 35.

After adjustment of the radiation thermometer 49 is completed, the radiation thermometer 49 performs an operation based on adjustment data which are stored in the adjustment data storage means 56. Hence, the adjustment data storage means 56 is preferably formed by a non-volatile memory which is rewritable.

Figure 11:
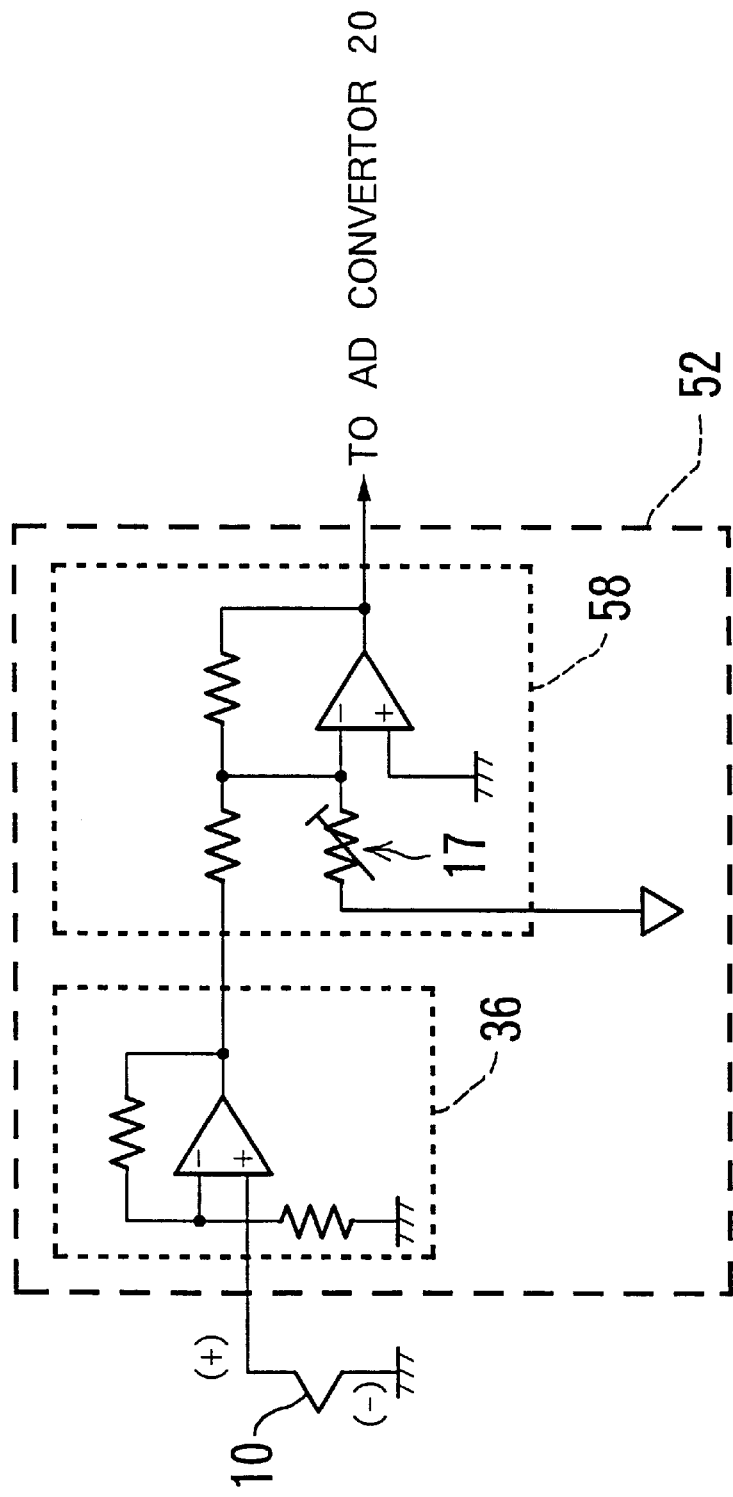
FIG. 11 is a circuitry diagram of infrared ray sensor output adjusting means shown in FIG. 10.

FIG. 11 is a circuitry diagram of the infrared ray sensor output adjusting means 52 which is shown in FIG. 10.

The offset adjusting means 17 shown in FIG. 10 is realized by a variable resistor disposed within an addition circuit 58 shown in FIG. 11. The variable resistor which realizes the offset adjusting means 17 is realized by a variable resistor which can be varied from outside. Further, the infrared ray sensor output adjusting means 52 comprises the amplifying means 36 which amplifies an output from the first infrared ray sensor 10.

The respective adjusters of the second preferred embodiment do not perform RES adjustment but are otherwise the same as the adjusters according to the first preferred embodiment. The other adjustment remains the same as in the first preferred embodiment, and therefore, will not be described.

Although the second preferred embodiment requires that KAN adjustment is executed in a low temperature environment at 16° C. and DRI adjustment is executed in a normal environment at room temperature, conversely, KAN adjustment may be executed in a normal environment at room temperature and DRI adjustment may be executed at a low temperature environment.

Further, KAN fine adjustment only needs to be performed after RES adjustment, while KAN rough adjustment may be performed before RES adjustment or simultaneously with RES adjustment.

Figure 12:
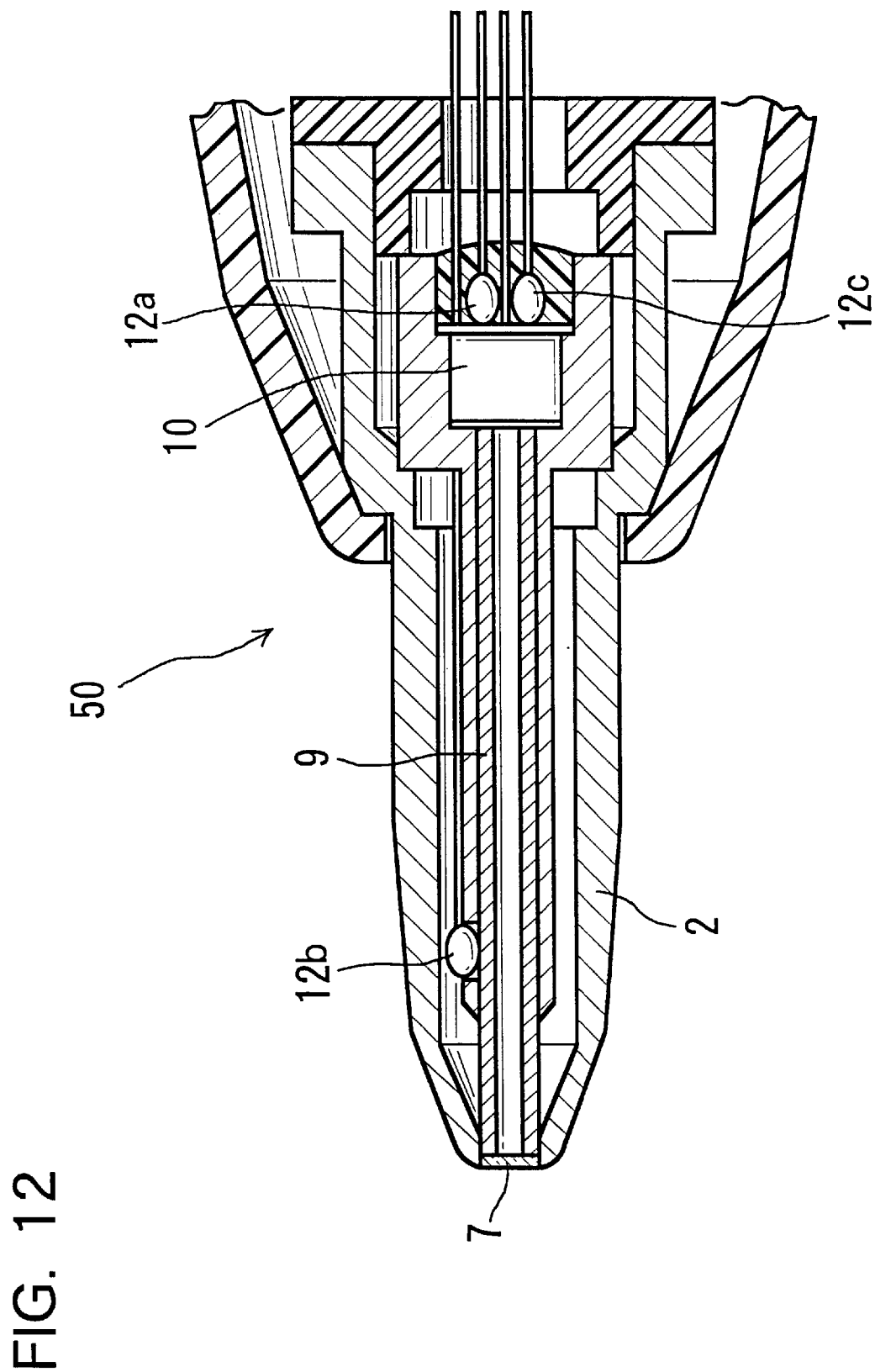
FIG. 12 is a cross sectional view of a probe portion of a radiation thermometer according to a third preferred embodiment of the present invention.

FIG. 12 is a cross sectional view of a portion of the probe of a radiation thermometer according to a third preferred embodiment of the present invention. The third preferred embodiment is different from the first preferred embodiment described earlier, with respect to temperature compensation of the optical system.

The shape and structure of the probe of the radiation thermometer according to the third preferred embodiment are similar to those of the radiation thermometer according to the second preferred embodiment shown in FIG. 9. A light-guiding tube 9 extends in an axial direction inside the probe 2, the front end of the light-guiding tube 9 is blocked by the filter 7, and the infrared ray sensor 10 for detecting an infrared ray from a measurement target is disposed at the rear end of the light-guiding tube 9. A first temperature-sensitive sensor 12*a* and a third temperature-sensitive sensor 12*c* for measuring the temperature of the infrared ray sensor itself are fixed by an adhesive agent in contact with the rear surface of the infrared ray sensor 10. A temperature-sensitive sensor 12*b* for measuring the temperature of the light-guiding tube 9 is fixed to the side surface of the light-guiding tube 9 by an adhesive agent.

While the light-guiding tube 9 and the second infrared ray sensor 11 perform temperature compensation of the optical system in the first preferred embodiment described earlier, in the third preferred embodiment, the second temperature-sensitive sensor 12*b* and the third temperature-sensitive sensor 12*c* form temperature difference detecting means 120 which performs temperature compensation of the optical system and will be described later.

Figure 13:
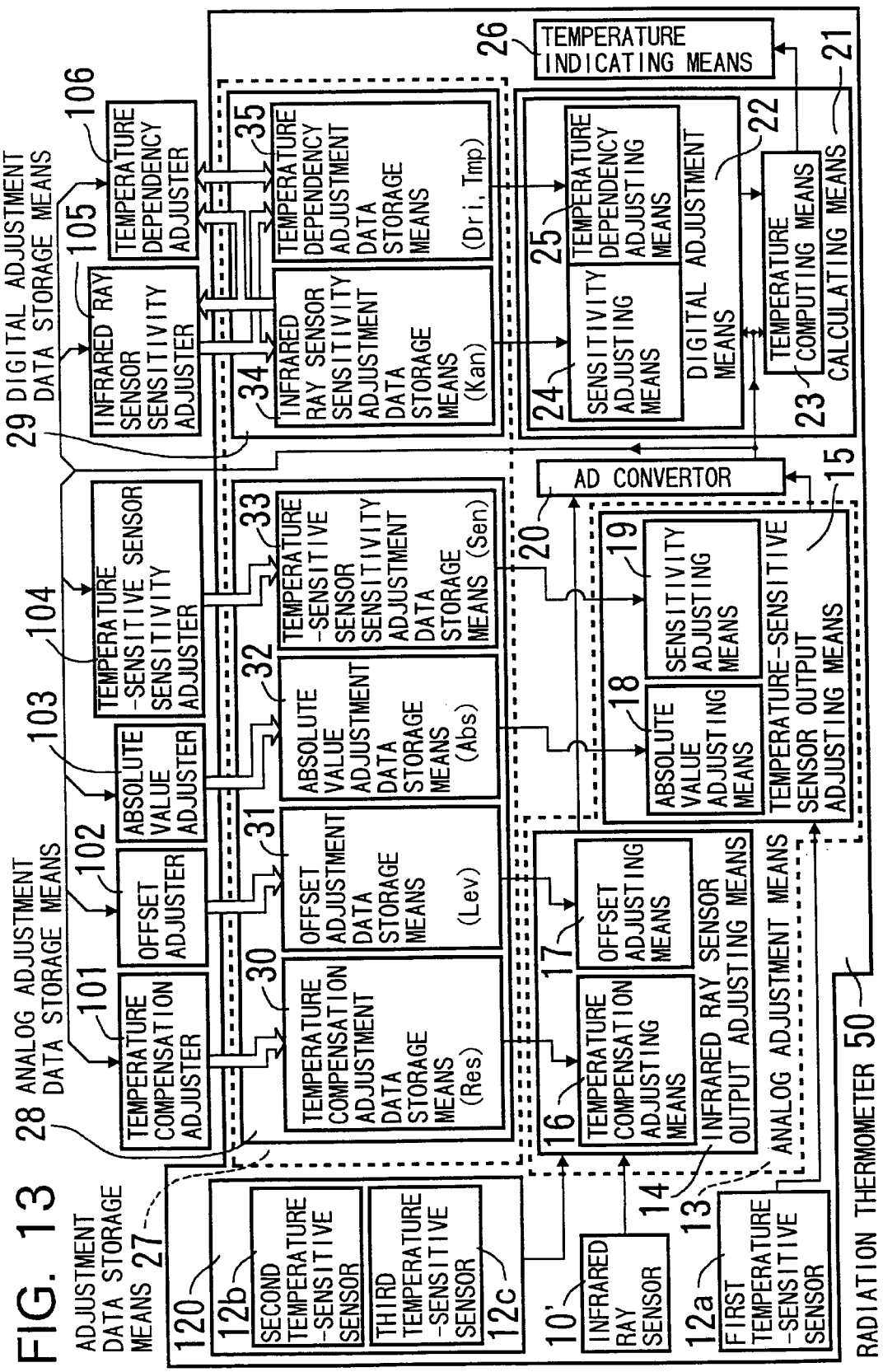
FIG. 13 is a block diagram showing a structure of the radiation thermometer shown in FIG. 12.

FIG. 13 is a block diagram showing a circuit structure of a radiation thermometer 50 according to the third preferred embodiment. The illustrated circuit structure is almost the same as the circuit structure shown in FIG. 3 according to the first preferred embodiment, except for that one infrared ray sensor 10' is disposed instead of disposing the first and the second infrared ray sensors 10 and 11 as in the first preferred embodiment, three temperature-sensitive sensors, namely, the first temperature-sensitive sensor 12*a*, the second temperature-sensitive sensor 12*b* and the third temperature-sensitive sensor 12*c* are disposed instead of disposing one temperature-sensitive sensor 12, and the second temperature-sensitive sensor 12*b* and the third temperature-sensitive sensor 12*c* form the temperature difference detecting means 120. Although the first temperature-sensitive sensor 12*a* functions in a similar manner to the temperature-sensitive sensor 12 of the first preferred embodiment, as described later, outputs from the second temperature-sensitive sensor 12*b* and the third temperature-sensitive sensor 12*c* are used for adjustment of temperature compensation.

Operations and various types of adjustments for measuring body temperature according to the third preferred embodiment are the same as operations and various types of adjustments for measuring body temperature according to the first preferred embodiment described earlier, and therefore, will not be described. Instead, only adjustments in temperature compensation which are different from the first preferred embodiment will be described in the following with reference to FIG. 14.

Figure 14:
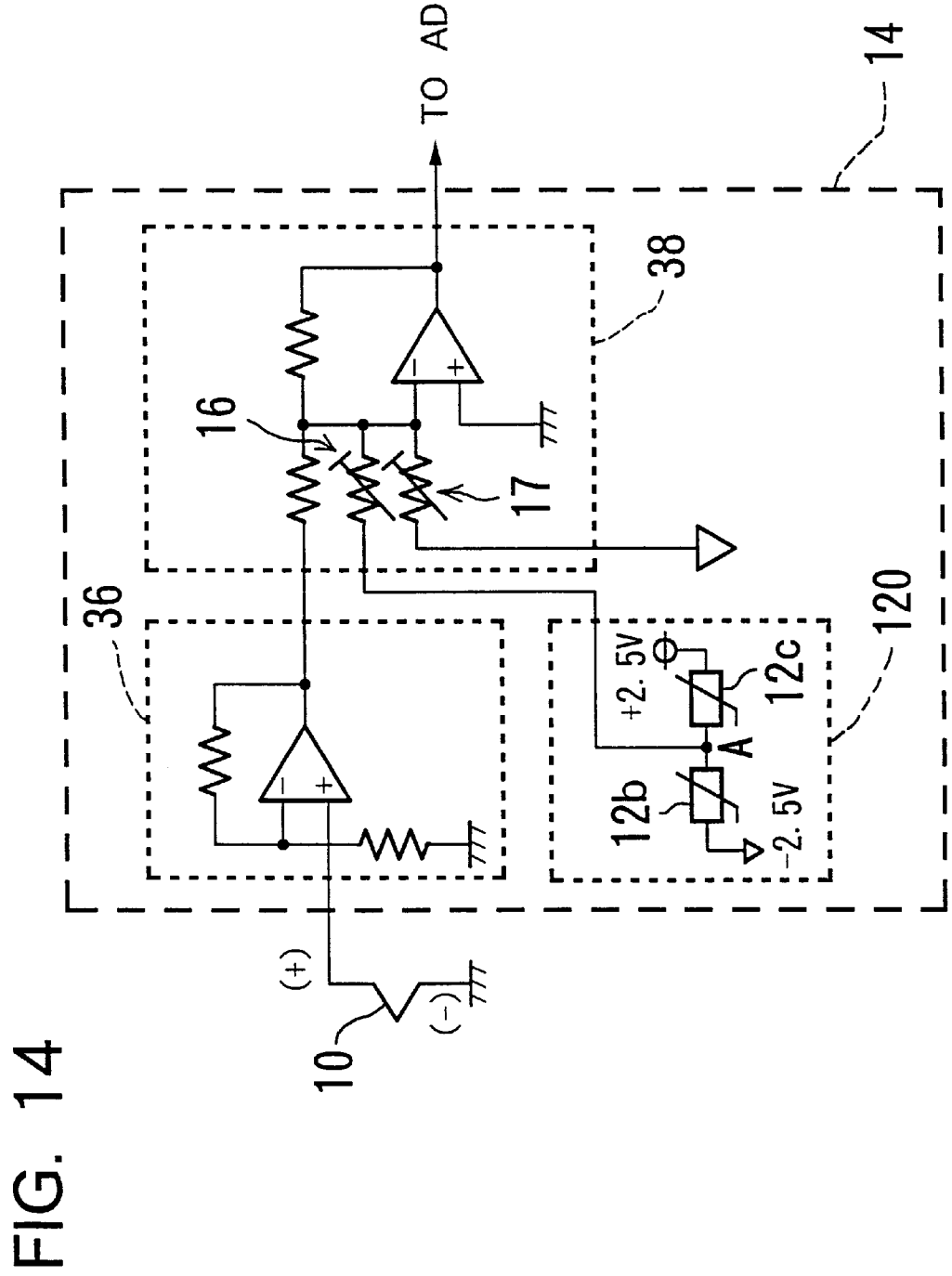
FIG. 14 is a circuitry diagram of infrared ray sensor output adjusting means shown in FIG. 13.

FIG. 14 is similar to FIG. 4 which illustrates the first preferred embodiment, showing a circuitry diagram of the infrared ray sensor output adjusting means 14.

A difference from the circuitry arrangement shown in FIG. 4 is that the temperature compensation adjusting means 16 receives an output from the temperature difference detecting means 120, that is, an electric potential at a connection point (A) between the second temperature-sensitive sensor 12*b* and the third temperature-sensitive sensor 12*c* which form the temperature difference detecting means 120. As the second temperature-sensitive sensor 12*b* is provided at one terminal with −2.5 V and the third temperature-sensitive sensor 12*c* is provided at one terminal with +2.5 V, an electric potential at the connection point (A) between the second temperature-sensitive sensor 12*b* and the third temperature-sensitive sensor 12*c* is approximately 0 V if a temperature of the light-guiding tube 9 which is detected by the second temperature-sensitive sensor 12*b* is equal to a temperature of the infrared ray sensor 10 which is detected by the third temperature-sensitive sensor 12*c*, whereas a positive or negative electric potential appears at the connection point (A) if there is a difference between the two temperatures. The electric potential at the connection point (A) is supplied to the temperature compensation adjusting means 16, added in the addition circuit 38 to an amplified output from the infrared ray sensor 10 and an output from the offset adjusting means 17 and sent to the AD convertor 20, as in the first preferred embodiment. An R-2R ladder resistor-type D-A convertor like that shown in FIG. 5 in relation to the first preferred embodiment, for example, is used as the temperature compensation adjusting means 16. An operation for adjustment of temperature compensation based on an output from the temperature difference detecting means 120 is the same as that described in relation to the first preferred embodiment, and therefore, will not be described.

The third preferred embodiment is as described above. Nevertheless, in the third preferred embodiment, for the purpose of adjustment of temperature compensation, the first temperature-sensitive sensor 12*a* and the third temperature-sensitive sensor 12*c* may be replaced with one temperature-sensitive sensor. In this case, however, the replacing temperature-sensitive sensor is required to have the function of measuring the temperature of the infrared ray sensor 10 for the purpose of measuring a temperature of a measurement target and the function of measuring the temperature of the infrared ray sensor 10 for the purpose of adjustment of temperature compensation, and therefore, it is necessary to switch circuit connections to attain the former objective, the replacing temperature-sensitive sensor is connected at the position of the temperature-sensitive sensor 12 shown in FIG. 6 described in relation to the first preferred embodiment and resistance of the replacing temperature-sensitive sensor is measured, whereas to attain the latter objective, the replacing temperature-sensitive sensor is connected at the position of the third temperature-sensitive sensor 12c of the temperature difference detecting means 120 shown in FIG. 14 described in relation to the third preferred embodiment.

While the foregoing has been described in the present invention in relation to the first through the third preferred embodiments which are each directed to an example where the radiation thermometer according to the present invention is inserted into an external acoustic opening of a human body and body temperature of the human body is measured, the radiation thermometer according to the present invention can be inserted into a mouth rather than the external acoustic opening to thereby measure body temperature, and can be inserted into an ear of an animal to thereby measure body temperature of the animal. Thus, applications of the present invention are not particularly limited.

As described above, the present invention provides a radiation thermometer which better improves accuracy in the results of measurement of a body temperature. Further, the present invention provides an easy method of adjusting the radiation thermometer.

According to the present invention, it is possible to perform ABS adjustment and KAN adjustment. This allows ABS adjustment to absorb a variation in an absolute value of the temperature-sensitive sensor, and therefore, to improve mass productivity. Further, this allows KAN adjustment to absorb a variation in the sensitivities of the infrared ray sensors, and therefore, to improve mass productivity.

Further, according to the present invention, it is possible to perform LEV adjustment, which enables adjustment of an offset of the amplifying circuits of the infrared ray sensors, and hence, to improve accuracy other than in KAN adjustment. While an amplifying circuit which is free from a varying offset is expensive, the present invention does not require use of such an expensive amplifying circuit, which creates another effect in that the radiation thermometer is obtained inexpensively.

Further, the present invention creates an effect that it is possible to efficiently and smoothly perform adjustment and assembly of the radiation thermometer.

Further, according to the present invention, it is possible to perform SEN adjustment, which creates an effect in that it is possible to accurately measure a temperature in a wide range of environmental temperatures.

Further, the present invention creates an effect in that it is possible to efficiently and smoothly perform adjustment and assembly of the radiation thermometer.

Further, according to the present invention, it is possible to perform RES adjustment, and therefore, even when the heat balance of the optical system is not in equilibrium, it is possible to accurately measure a temperature.

Further, according to the present invention, even when the heat balance of the optical system is not in equilibrium, it is possible to accurately perform KAN adjustment.

Further, the present invention creates an effect in that it is possible to accurately measure a temperature even in a low temperature environment.

Further, according to the present invention, it is possible to perform DRI adjustment, and therefore, it is possible to accurately measure a temperature in a wide range of environmental temperatures.

Still further, the present invention allows efficient adjustment since each type of adjustment is executed as analog adjustment and digital adjustment. In short, according to the present invention, analog adjustment is performed for the purpose of adjustment which does not demand a high resolution so that the burden on the computing means such as a microcomputer is reduced, whereas digital adjustment is performed for the purpose of adjustment which demands a high resolution and hence cannot be easily realized in an analog manner.

Industrial Applicability

Thus, the present invention is preferably applied to a radiation thermometer which is inserted to a opening of a living being and can measure a temperature of the living being.

What is claimed is:

1. A radiation thermometer, comprising:
   an infrared ray sensor for detecting an infrared ray from a measurement target;
   a temperature-sensitive sensor for generating a reference temperature signal;
   sensor output adjusting means for adjusting an output from said temperature-sensitive sensor and an output from said infrared ray sensor;
   temperature calculating means for calculating a temperature of said measurement target based on an adjusted temperature-sensitive sensor output and an adjusted infrared ray sensor output which are adjusted by said sensor output adjusting means; and
   temperature indicating means for indicating said temperature of said measurement target based on a signal from said temperature calculating means,
   wherein said sensor output adjusting means comprises temperature-sensitive sensor absolute value adjusting means (ABS) for adjusting an absolute value of a characteristic of said temperature-sensitive sensor and infrared ray sensor sensitivity adjusting means (KAN) for adjusting sensitivity of said infrared ray sensor.

2. A method of adjusting the radiation thermometer of claim 1, wherein after adjustment by said temperature-sensitive sensor absolute value adjusting means (ABS), said infrared ray sensor sensitivity adjusting means (KAN) performs adjustment.

3. The radiation thermometer of claim 1, wherein said sensor output adjusting means further comprises infrared ray sensor offset adjusting means (LEV) for adjusting an offset of an amplifying circuit which amplifies an output from said infrared ray sensor.

4. A method of adjusting the radiation thermometer of claim 3, wherein after adjustment by said temperature-sensitive sensor absolute value adjusting means (ABS) and adjustment by said infrared ray sensor offset adjusting means (LEV), said infrared ray sensor sensitivity adjusting means (KAN) performs adjustment.

5. The radiation thermometer of claim 1, wherein said sensor output adjusting means further comprises temperature-sensitive sensor sensitivity adjusting means (SEN) for adjusting sensitivity of said temperature-sensitive sensor.

6. A method of adjusting the radiation thermometer of claim 5, wherein said temperature-sensitive sensor sensitivity adjusting means (SEN) performs adjustment at least after adjustment by said temperature-sensitive sensor absolute value adjusting means (ABS) but before adjustment by said infrared ray sensor sensitivity adjusting means (KAN).

7. The radiation thermometer of claim 1, further comprising an optical system for guiding said infrared ray from said measurement target to said infrared ray sensor, wherein said sensor output adjusting means further comprises temperature compensation adjusting means (RES) for adjusting a temperature compensation quantity of said optical system.

8. The radiation thermometer of claim 7, wherein said temperature compensation adjusting means (RES) adjusts said temperature compensation quantity based on an output from another infrared ray sensor which detects only an infrared ray which is radiated from said optical system itself.

9. The radiation thermometer of claim 7, which comprises a temperature-sensitive sensor which measures a temperature of said optical system and a temperature-sensitive sensor which measures a temperature of said infrared ray sensor, wherein said temperature compensation adjusting means (RES) adjusts said temperature compensation quantity based on an output from said temperature-sensitive sensor which measures a temperature of said optical system and an output from said temperature-sensitive sensor which measures a temperature of said infrared ray sensor.

10. The radiation thermometer of claim 9, wherein said reference temperature signal is a signal which is based on a temperature of said infrared ray sensor, and said temperature-sensitive sensor which measures a temperature of said infrared ray sensor also serves as a temperature-sensitive sensor which generates said reference temperature signal.

11. A method of adjusting the radiation thermometer of claim 7, wherein said temperature compensation adjusting means (RES) performs adjustment after adjustment by said infrared ray sensor offset adjusting means (LEV) and/or adjustment by said temperature-sensitive sensor absolute value adjusting means (ABS) but before adjustment by said infrared ray sensor sensitivity adjusting means (KAN).

12. The radiation thermometer of claim 7, wherein said sensor output adjusting means further comprises said temperature-sensitive sensor sensitivity adjusting means (SEN) which adjusts said sensitivity of said temperature-sensitive sensor.

13. A method of adjusting the radiation thermometer of claim 12, wherein said temperature-sensitive sensor sensitivity adjusting means (SEN) performs adjustment after adjustment by said infrared ray sensor offset adjusting means (LEV) or adjustment by said temperature-sensitive sensor absolute value adjusting means (ABS) but before adjustment by said temperature compensation adjusting means (RES).

14. The radiation thermometer of claim 1, wherein said sensor output adjusting means further comprises infrared ray sensor temperature dependency adjusting means (DRI) for adjusting a temperature characteristic of said infrared ray sensor sensitivity.

15. A method of adjusting the radiation thermometer of claim 14, wherein said infrared ray sensor temperature dependency adjusting means (DRI) performs adjustment after adjustment by said infrared ray sensor sensitivity adjusting means (KAN).

16. The radiation thermometer of claim 1, wherein said temperature-sensitive sensor absolute value adjusting means (ABS) comprises analog adjustment means which adjusts an output therefrom on an analog circuit, and said infrared ray sensor sensitivity adjusting means (KAN) comprises digital adjustment means which adjusts an output therefrom through digital computation.

17. The radiation thermometer of claim 3, wherein said infrared ray sensor offset adjusting means (LEV) comprises analog adjustment means which adjusts an output therefrom on an analog circuit.

18. The radiation thermometer of claim 5, wherein said temperature-sensitive sensor sensitivity adjusting means (SEN) comprises analog adjustment means which adjusts an output therefrom on an analog circuit.

19. The radiation thermometer of claim 7, wherein said temperature compensation adjusting means (RES) comprises analog adjustment means which adjusts an output therefrom on an analog circuit.

20. The radiation thermometer of claim 14, wherein said infrared ray sensor temperature dependency adjusting means (DRI) comprises digital adjustment means which adjusts an output therefrom through digital computation.

21. The radiation thermometer of claim 1, wherein said sensor output adjusting means comprises:
analog adjustment means which adjusts an output therefrom on an analog circuit;
digital adjustment means which adjusts an output therefrom through digital computation; and
adjustment data storage means for storing analog adjustment data which are used in adjustment performed by said analog adjustment means and digital adjustment data which are used in adjustment performed by said digital adjustment means, and
said analog adjustment data and said digital adjustment data are stored in a digital form in said adjustment data storage means.

22. The radiation thermometer of claim 21, wherein said adjustment data storage means is formed by a non-volatile memory which is rewritable.

* * * * *